US006938265B2

(12) United States Patent
Ezawa et al.

(10) Patent No.: US 6,938,265 B2
(45) Date of Patent: Aug. 30, 2005

(54) TURNTABLE FOR DISK STORAGE MEDIUM AND DISK DRIVE INCLUDING THE TURNTABLE

(75) Inventors: Kozo Ezawa, Hirakata (JP); Masanao Wakikawa, Sakai (JP); Kazuo Teramae, Hirakata (JP); Terumi Tatsumi, Sendai (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 225 days.

(21) Appl. No.: 10/120,693

(22) Filed: Apr. 11, 2002

(65) Prior Publication Data

US 2002/0150029 A1 Oct. 17, 2002

(30) Foreign Application Priority Data

Apr. 12, 2001 (JP) ........................................ 2001-113670

(51) Int. Cl.⁷ .......................... G11B 23/00; G11B 21/02
(52) U.S. Cl. ....................................... 720/710; 720/717
(58) Field of Search .............................. 720/695, 703, 720/715, 717, 710, 706–708; 360/99.04, 99.05; 369/270, 271

(56) References Cited

U.S. PATENT DOCUMENTS

| | | | | |
|---|---|---|---|---|
| 4,532,622 A | * | 7/1985 | Newbold | 369/271 |
| 4,649,531 A | * | 3/1987 | Horowitz et al. | 369/270 |
| 4,737,948 A | * | 4/1988 | Okita | 369/270 |
| 5,115,366 A | * | 5/1992 | Oishi | 360/133 |
| 5,323,379 A | * | 6/1994 | Kim | 720/707 |
| 5,438,564 A | * | 8/1995 | Takahashi | 369/290 |
| 5,555,233 A | * | 9/1996 | Yano et al. | 369/270 |
| 5,633,856 A | * | 5/1997 | Mukawa | 369/270 |
| 5,799,006 A | * | 8/1998 | Mukawa | 720/707 |
| 5,889,757 A | * | 3/1999 | Mori et al. | 369/282 |
| 6,038,206 A | * | 3/2000 | Mukawa | 369/271 |
| 6,041,033 A | * | 3/2000 | Otsubo et al. | 720/707 |
| 6,072,767 A | * | 6/2000 | Iwazawa | 369/271 |
| 6,208,613 B1 | * | 3/2001 | Iizuka | 720/707 |
| 6,226,254 B1 | * | 5/2001 | Komatsu et al. | 369/270 |
| 6,549,508 B1 | * | 4/2003 | Matsumoto et al. | 369/264 |
| 6,697,320 B2 | * | 2/2004 | Yeh et al. | 369/270 |

FOREIGN PATENT DOCUMENTS

| | | |
|---|---|---|
| JP | 7-41785 | 7/1995 |
| JP | 08-335351 | 12/1996 |
| JP | 09-265726 | 10/1997 |
| JP | 2000-11770 | 4/2000 |

* cited by examiner

*Primary Examiner*—Brian E. Miller
(74) *Attorney, Agent, or Firm*—Akin Gump Strauss Hauer & Feld, LLP

(57) ABSTRACT

A turntable for a disk storage medium includes disk mounting section, shaft center boss and ribs. The disk mounting section includes disk mount surface, center boss and inner side surface. The disk mount surface is used to mount the disk medium thereon. The center boss has an outer side face that engages with a center hole of the disk medium. The inner side face defines a space that has a center axis aligned with that of the center boss. The shaft center boss includes an outer side face and a hole into which a rotating shaft is inserted so as to transmit a driving force to, and rotate, the disk medium. The ribs join the outer side face of the shaft center boss and the inner side face of the disk mounting section together so that through holes are formed between these side faces.

21 Claims, 18 Drawing Sheets

PRIOR ART

PRIOR ART

TURNTABLE FOR DISK STORAGE MEDIUM AND DISK DRIVE INCLUDING THE TURNTABLE

BACKGROUND OF THE INVENTION

1. Field of the Invention

The present invention relates to a turntable for a disk storage medium and a disk drive including the turntable.

2. Description of the Related Art

Apparatuses for reading or writing digital information optically and/or magnetically from/on a removable disk storage medium have been getting more and more popularized.

FIG. 14 schematically illustrates a configuration for a disk drive 100 as an example of such apparatuses. The disk drive 100 shown in FIG. 14 is for use to optically read and write information from/on a disk 101. As shown in FIG. 14, the disk drive 100 includes turntable 102, motor 104 as a drive source for spinning the turntable 102, read/write head 105 for reading or writing information from/on the disk 101, and clamper 103 for securing and supporting the disk 101 onto the turntable 102.

The turntable 102 includes a center boss 102A, which is to be inserted into the center hole 101A of the disk 101 when the disk 101 is mounted thereon and to which a yoke 107 made of a magnetic material has been attached. In this disk drive 100, the turntable 102 is directly fitted with the rotating shaft (not shown) of the motor 104.

The read/write head 105 moves in the direction indicated by the arrow 153 in FIG. 14 (i.e., in the disk radial direction) using a main shaft 106L and a jackshaft 106R as respective guides. A magnet 103A has been fitted within the damper 103.

To load the disk 101 into this disk drive 100, the disk 101 is moved downward as indicated by the arrow 151 in FIG. 14 so as to be mounted onto the turntable 102 with its center hole 101A engaged with the center boss 102A of the turntable 102. Thereafter, the damper 103 is also moved downward as indicated by the arrow 152 in FIG. 14 so as to approach the disk 101. In this case, the magnet 103A is attracted toward the yoke 107. Thus, the damper 103 forces the disk 101 onto the turntable 102 and fixes it thereon. According to another known technique, a force may be applied to the damper 103 in the direction indicated by the arrow 152 by using an elastic member such as a spring instead of the yoke 107 and magnet 103A.

Once the disk 101 has been fixed on the turntable 102 in this manner, the motor 104 starts to rotate the turntable 102, thereby spinning the disk 101. Then, the read/write head 105, which has been moving in the direction indicated by the arrow 153, stops at a predetermined position to read or write information from/onto the disk 101 there.

Hereinafter, the structure of the conventional turntable 102 will be described in further detail.

FIGS. 15 and 16 are perspective views respectively illustrating the top and bottom of the turntable 102. FIGS. 17a–17c illustrate projections (FIGS. 17a and 17c) and a cross-sectional view FIG. 17b of the turntable 102. In FIGS. 17a–17c projections of the top and bottom of the turntable 102 are illustrated in FIGS. 17a and 17c, respectively, and a cross-sectional view of the turntable 102 taken along the line XVII—XVII is illustrated in FIG. 17b. As shown in FIGS. 15, 16 and 17a–17c the center boss 102A and a bottom boss 102B have been formed on the top and bottom of the turntable 102, respectively. Also, a center hole 102C has been formed so as to go through the center boss 102A and the bottom boss 102B. The rotating shaft of the motor 104 has been inserted into, and fitted within, this center hole 102C. In this case, the shaft is normally. interference-fitted within the center hole 102C. Alternatively, the shaft may also be transition-fitted within the center hole 102C via an adhesive, for example.

After the turntable 102 has been secured onto the rotating shaft of the motor 104 in this manner, the yoke 107 is moved downward as indicated by the arrow 154 in FIG. 18 so as to be embedded at a predetermined position of the turntable 102. Then, the turntable 102 is now ready to spin the disk 101 once the disk 101 is mounted thereon.

The turntable 102 is molded out of a resin. Generally speaking, when a resin or metal is molded with a die, the molded product should preferably have a uniform thickness. Also, even when the material is molded plastically without using a die, it is preferable to eliminate unnecessarily thick portions as much as possible. For that purpose, the center boss 102A of the turntable 102 is provided with a hollow portion 102D and a shaft center boss 102E is further formed inside the center boss 102A as shown in FIGS. 15 and 17a–17c. As a result, the shaft center boss 102E and the bottom boss 102B are joined together via a portion 201 and the center hole 102C extends through both the shaft center and bottom bosses 102E and 102B as shown in FIGS. 17a–17c. This portion 201 is continuously formed so as to surround the shaft center boss 102E and the bottom boss 102B entirely.

Normally, unless the temperature of a product that has been molded out of a resin or metal with a die changes uniformly everywhere, the material of the molded product will shrink non-uniformly as the material is cooled. As a result, the product will be partially deformed (i.e., so-called "sink marks" will be created). To avoid this unwanted situation, it is preferable to minimize the percentage of portions that are not exposed on the outer shell of a molded product.

In the conventional turntable 102, however, the portion 201 of the product made of resin is much thicker than any other portion that makes up the center hole 102C as shown in FIGS. 17a–17c. In other words, the portion 201 has some internal parts that are relatively distant from the outer shell as compared with portions 202 and 203 of the shaft center boss 102E and bottom boss 102B. Accordingly, when the resin material is molded into this turntable 102, the molded material will have a non-uniform temperature distribution. Thus, part of the material will shrink differently.

As a result, that portion 201 of the molded material is drawn in the directions indicated by the arrows 154 and 155 in FIG. 17b, thereby creating sink marks 204 and 205 there as shown in FIG. 19. In FIG. 19, the sink marks are identified by the two reference numerals 204 and 205. Actually, though, sink marks are created all around the center hole 102C. Thus, the sunken portions will have an increased inner diameter.

The storage capacity of a disk storage medium like this has recently been increased by leaps and bounds. To make full use of that high capacity, the disk needs to be rotated with higher and higher precision. That is to say, it has become more and more necessary to minimize waving or fluttering of a disk being rotated.

However, once the sink marks 204 and 205 have been created on the inner surface of the center hole 102C, the shaft of the motor 104 will be inserted into the center hole 102C so as to tilt along the inner surface of the center hole 102C that has been deformed by the sink marks 204 and 205 as indicated by the dashed lines 104A in FIG. 19. As a result, the turntable 102 will also tilt with respect to the motor 104. In such a state, when the motor 104 is rotated, the disk 101 being rotated will flutter. Then, information cannot be read or written from/on the disk 101 as intended.

FIG. 19 illustrates a state in which the shaft of the motor 104 inserted has just reached a midpoint of the center hole 102C. Even if the shaft inserted has gone through the center hole 102C, the shaft will also rest on the deformed inner surface of the center hole 102C with the sink marks 204 and 205. Accordingly, friction will be caused irregularly between the shaft inserted and the inner surface of the center hole 102C other than the sink marks 204 and 205. Thus, the inner surface of the center hole 102C might be further deformed. For these reasons, it is difficult to ensure sufficient fluttering precision for the turntable 102 that has been irregularly mounted on the shaft in this manner.

SUMMARY OF THE INVENTION

In order to overcome the problems described above, an object of the present invention is to provide a turntable that does not tilt when the shaft of a motor is inserted into the center hole thereof and that can prevent a disk storage medium being rotated by the motor from fluttering by minimizing the unwanted effects of sink marks to be created on the inner surface of the center hole.

Another object of the present invention is to provide a disk drive including such a turntable.

The present invention provides a turntable for a disk storage medium. The turntable includes disk mounting section, shaft center boss and ribs. The disk mounting section includes disk mount surface, center boss and inner side surface. The disk mount surface is used to mount the disk storage medium thereon. The center boss has an outer side face that engages with a center hole of the disk storage medium. The inner side face defines a space that has a center axis aligned with that of the center boss. The shaft center boss includes an outer side face and a hole into which a rotating shaft is inserted so as to transmit a driving force to, and rotate, the disk storage medium. The ribs join the outer side face of the shaft center boss and the inner side face of the disk mounting section together so that multiple through holes are formed between the outer side face of the shaft center boss and the inner side face of the disk mounting section.

In one preferred embodiment of the present invention, each said rib is less thick than the shaft center boss.

In another preferred embodiment of the present invention, the disk mounting section includes a plurality of rib supporting bosses on the bottom thereof. A portion of each said rib is preferably connected to associated one of the rib supporting bosses.

In this particular preferred embodiment, each said rib supporting boss may be in the shape of a cylinder.

Preferably, the number of the ribs is three or more.

Specifically, the number of the ribs is preferably six.

More preferably, the disk mounting section, the shaft center boss and the ribs have been formed together out of a resin or a metal.

In that case, each said rib supporting boss preferably includes a protrusion at the bottom of its cylinder. The protrusion has preferably been formed by a gate, through which the resin or metal is injected, while the turntable is formed out of the resin or metal.

In still another preferred embodiment, the hole of the shaft center boss, into which the rotating shaft is inserted, has multiple concave portions on the inner side face thereof. The concave portions are arranged along the ribs.

In yet another preferred embodiment, the disk mounting section includes: a disk mounting base that includes the disk mount surface and the inner side face; and the center boss.

In this particular preferred embodiment, the disk mounting base, the shaft center boss and the ribs have been formed together out of a resin or a metal.

Specifically, each said rib supporting boss preferably includes a protrusion at the bottom of its cylinder. The protrusion has preferably been formed by a gate, through which the resin or metal is injected, while the turntable is formed out of the resin or metal.

More preferably, the disk mounting section includes a force-applying mechanism for applying a force on the disk storage medium so that the disk storage medium is pressed toward the disk mount surface.

In this particular preferred embodiment, the force-applying mechanism includes: a plurality of spherical bodies; a plurality of openings provided along the outer side face of the center boss; and an elastic body for applying a force on the spherical bodies so that the spherical bodies are pressed toward, and partially exposed through, the openings.

Specifically, the disk mounting section preferably further includes: a force-removing mechanism for removing the force that has been applied by the elastic body on the spherical bodies toward the openings; and a plurality of disk uplifting levers for lifting the disk storage medium up from the disk mount surface in conjunction with the force-removing mechanism.

More particularly, the number of the spherical bodies and the number of the disk uplifting levers are each three or more.

In yet another preferred embodiment, the center boss includes a member made of a ferromagnetic material.

A disk drive according to a preferred embodiment of the present invention includes: the turntable for the disk storage medium according to any of the preferred embodiments of the present invention described above; a read/write head for reading and/or writing information from/on the disk storage medium; and a driving unit that includes a rotating shaft that has been inserted into the hole of the shaft center boss of the turntable.

A disk drive according to another preferred embodiment of the present invention includes: the turntable for the disk storage medium that includes the member made of a ferromagnetic material; a read/write head for reading and/or writing information from/on the disk storage medium; a driving unit that includes a rotating shaft that has been inserted into the hole of the shaft center boss of the turntable; and a clamp including a magnetic body.

In a preferred embodiment of the present invention, the rotating shaft has been press-fitted with the shaft center boss.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Embodiment 1

Figure 1:
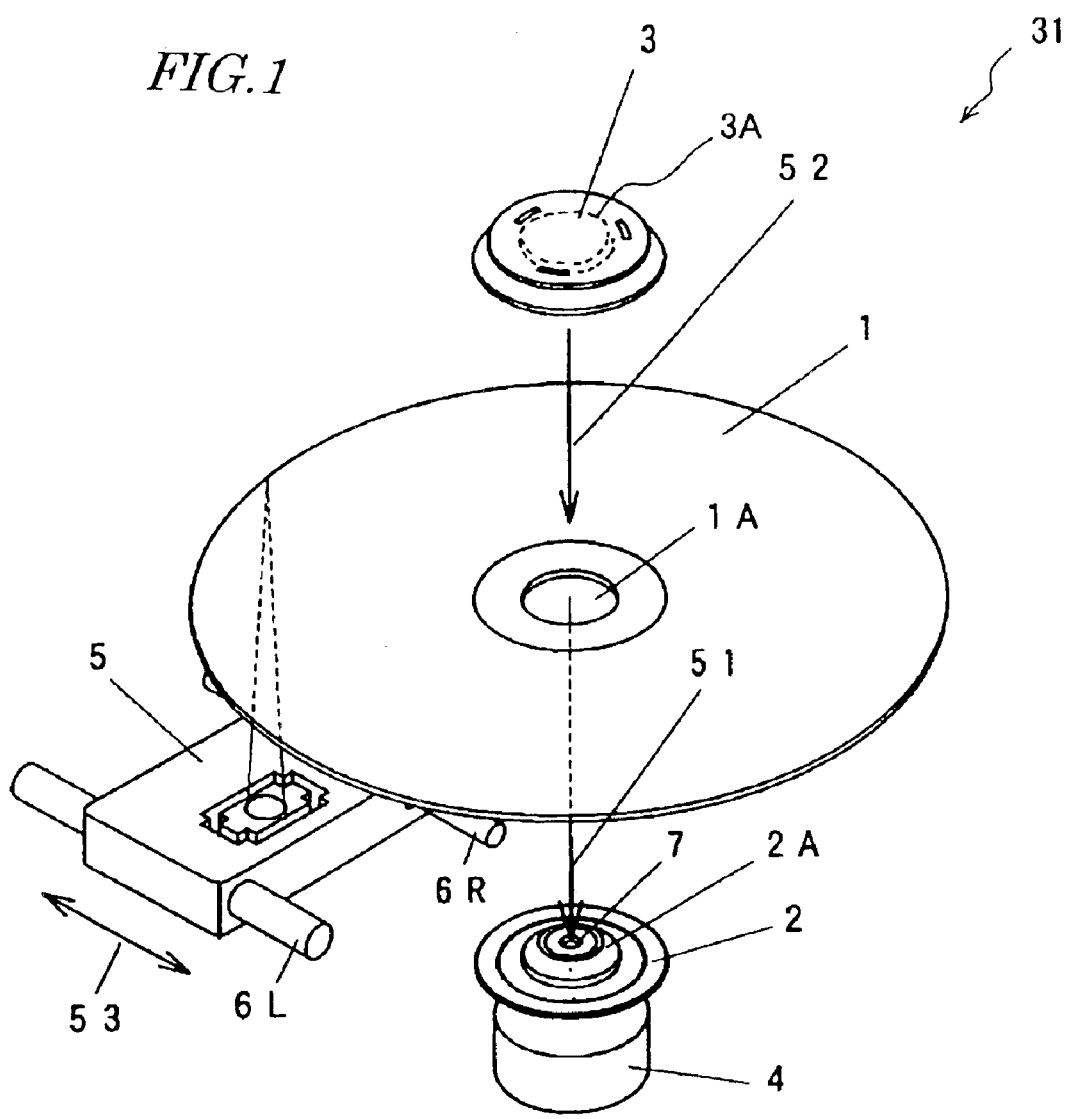
FIG. 1 is a perspective view schematically illustrating a disk drive according to a first specific preferred embodiment of the present invention.

FIG. 1 schematically illustrates a first specific preferred embodiment of the turntable and disk drive according to the present invention.

As shown in FIG. 1, the disk drive 31 includes turntable 2, motor 4 as a drive source for rotating the turntable 2, read/write head 5 for optically reading or writing information from/on a disk 1, and clamper 3 for securing and supporting the disk 1 onto the turntable 2.

The turntable 2 includes a center boss 2A, which is to be inserted into the center hole 1A of the disk 1 when the disk 1 is mounted thereon and on which a yoke 7 made of a magnetic material has been embedded. In this preferred embodiment, the turntable 2 is directly fitted with the rotating shaft (not shown) of the motor 4.

However, the turntable 2 does not have to be directly fitted with the rotating shaft of the motor 4. Alternatively, the motor 4 may also be connected to a rotating mechanism for transmitting the driving force of the motor 4 by way of gears, pulleys or belts or changing the rotational velocity of the motor 4. In that case, the turntable 2 may be mounted on a rotating shaft provided for such a rotating mechanism and may be rotated by using the rotating mechanism as a drive source.

The read/write head 5 moves in the direction indicated by the arrow 53 in FIG. 1 (i.e., in the disk radial direction) by using a main shaft 6L and a jackshaft 6R as respective guides. A magnet 3A has been fitted within the damper 3.

To load the disk 1 into this disk drive 31, the disk 1 is moved downward as indicated by the arrow 51 in FIG. 1 so as to be mounted onto the turntable 2 with its center hole 1A engaged with the center boss 2A of the turntable 2. Thereafter, the damper 3 is also moved downward as indicated by the arrow 52 in FIG. 1 so as to approach the disk 1. In this case, the magnet 3A is attracted toward the yoke 7. Thus, the damper 3 forces the disk 1 onto the turntable 2 and fixes it thereon. The damper 3 may be provided for a cover (not shown) that is used to load and unload the disk 1 into/from this disk drive 31 and may be moved along with the cover being closed or opened. Alternatively, the damper 3 may also be provided separately from the cover. Also, the damper 3 may be forced onto the disk 1 in the direction indicated by the arrow 52 by using an elastic member such as a spring instead of the magnet 3A. In that case, there is no need to provide the yoke 7 for the center boss 2A.

Once the disk 1 has been mounted on the turntable 2, the motor 4 starts to rotate the turntable 2, thereby spinning the disk 1. Then, the read/write head 5, which has been moving in the direction indicated by the arrow 53, stops at a predetermined position to read or write information from/onto the disk 1 there.

Figure 2:
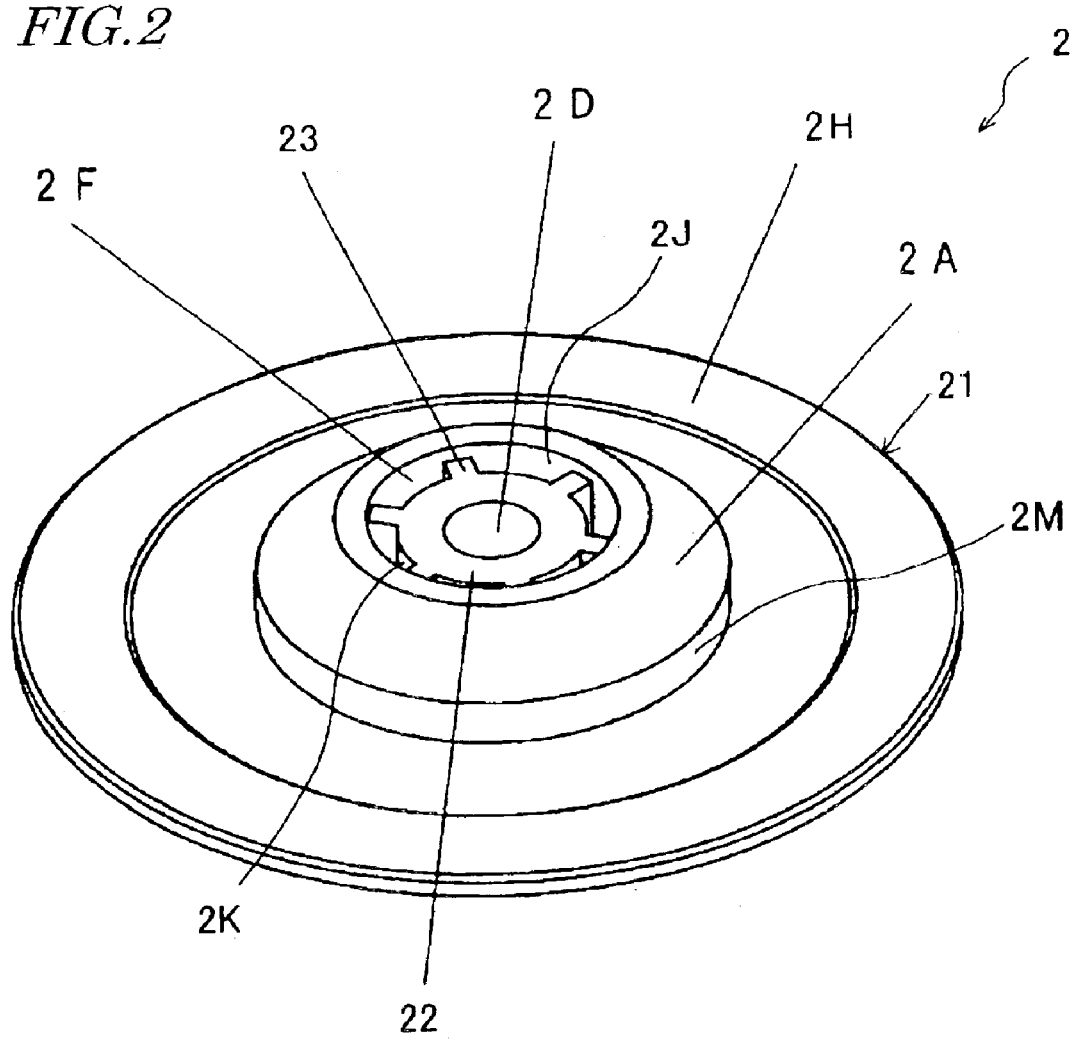
FIG. 2 is a perspective view of the turntable of the disk drive shown in FIG. 1 as viewed from above the turntable.
Figure 3:
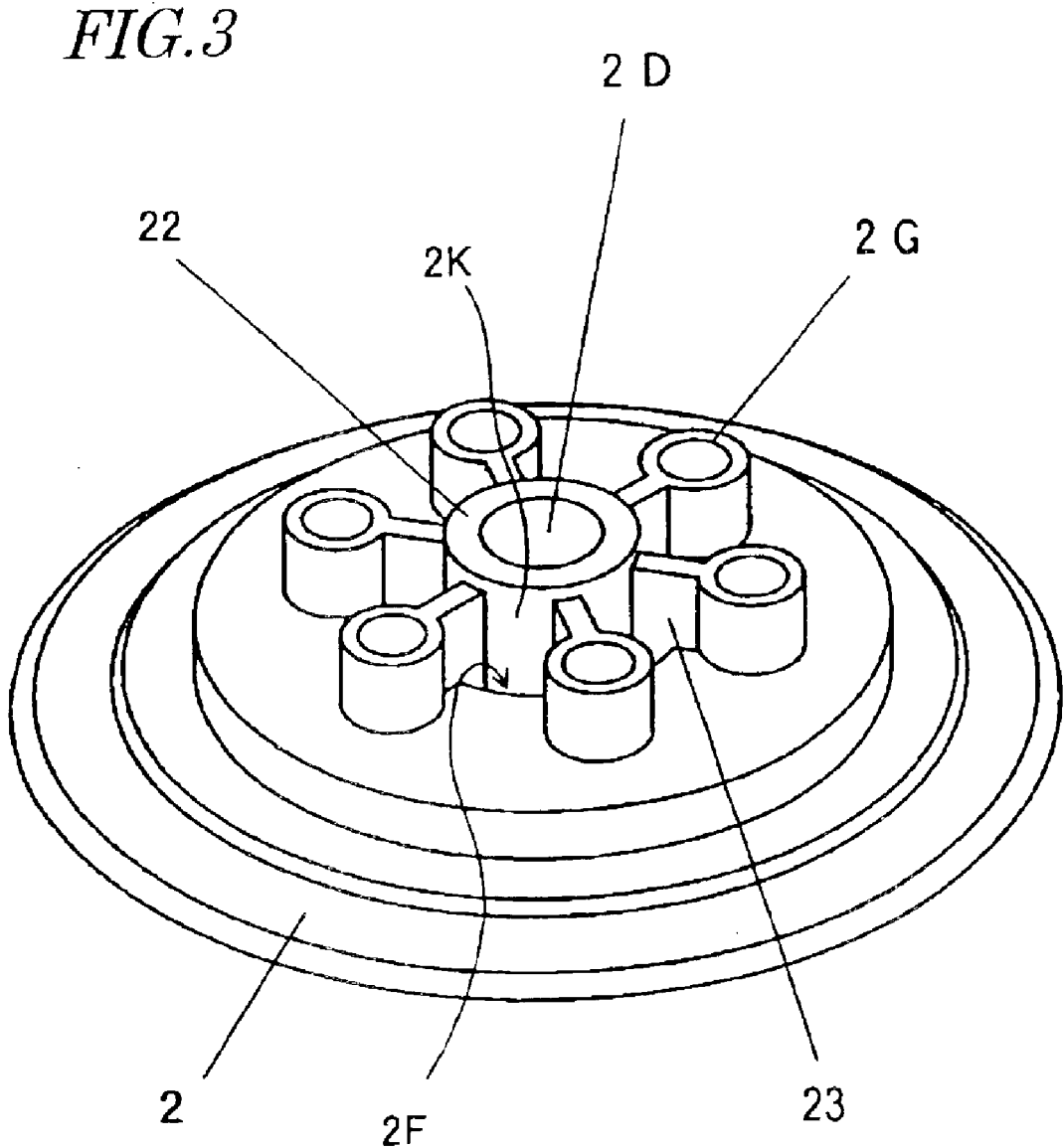
FIG. 3 is a perspective view of the turntable of the disk drive shown in FIG. 1 as viewed from below the turntable.
Figure 4:
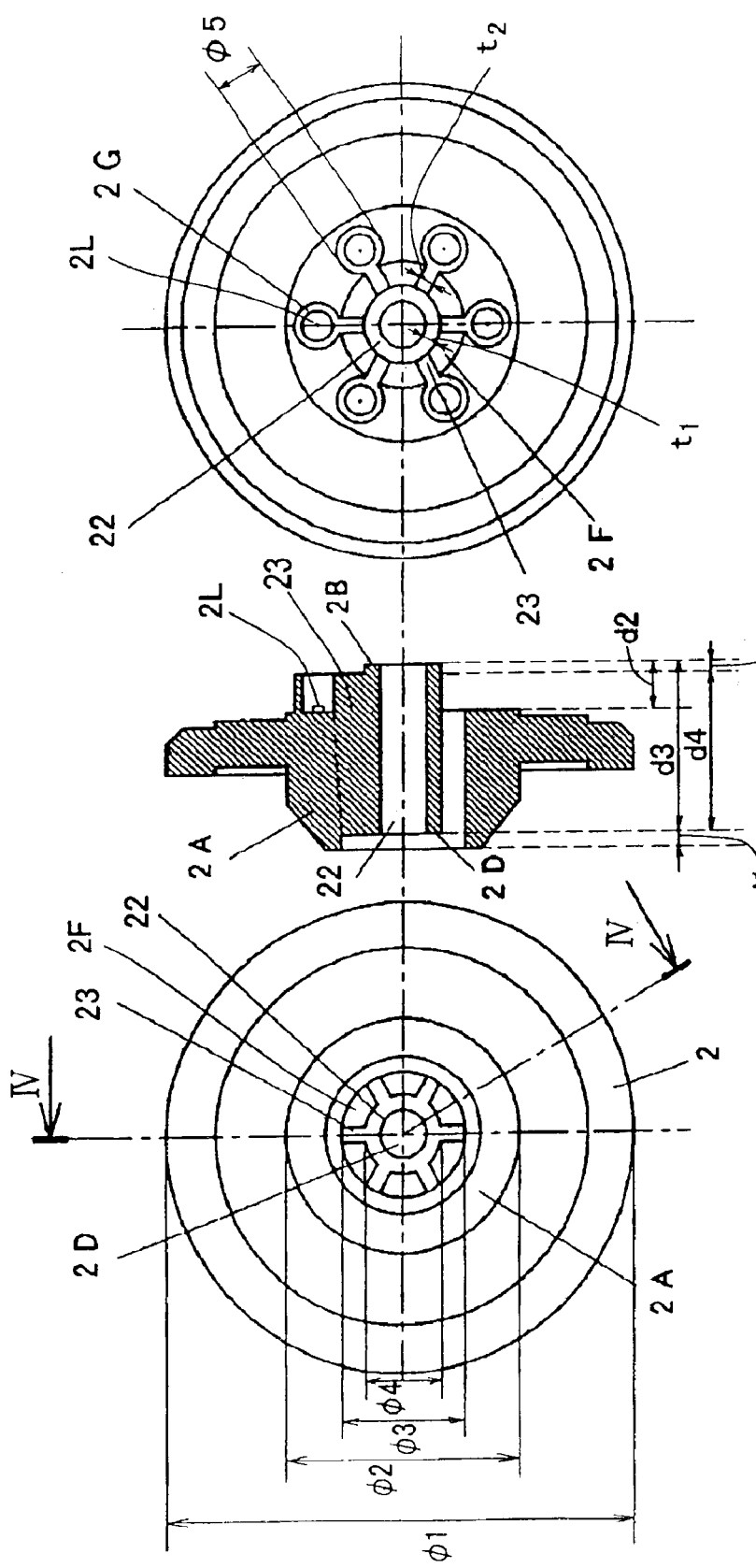
FIGS. 4a–4c illustrate projections (FIGS. 4a and 4c) and a cross-sectional view (FIG. 4b) of the turntable shown in FIGS. 2 and 3.

Hereinafter, the structure of the turntable 2 will be described in further detail. FIGS. 2 and 3 are perspective views illustrating the top and bottom of the turntable 2. FIGS. 4a–4c illustrate projections (FIGS. 4a and 4c) and a cross-sectional view (FIG. 4b) of the turntable 2. In FIGS. 4a–4c, projections of the top and bottom of the turntable 2 are illustrated in FIGS. 4a and 4c, respectively, and a cross-sectional view of the turntable 2 taken along the line IV—IV is illustrated in FIG. 4b.

As shown in FIG. 2, the turntable 2 includes disk mounting section 21, shaft center boss 22 and ribs 23. The disk mounting section 21 includes: a disk mount surface 2H for mounting the disk 1 thereon; a center boss 2A having an outer side face 2M that engages with the center hole 1A of the disk 1; and an inner side face 2J defining a cylindrical space. The center axis of the center boss 2A is aligned with that of the space defined by the inner side face 2J. In this preferred embodiment, a circular groove has been formed inside the mount surface 2H so as to surround the center boss 2A as shown in FIGS. 2 and 4a–4c.

The outer side face 2M of the center boss 2A defines the outer diameter of the center boss 2A. The center boss 2A will be inserted into the center hole 1A of the disk 1. The disk 1 to be supported on the mount surface 2H of the turntable 2 has its position determined by how the center hole 1A engages with the center boss 2A.

The shaft center boss 22 includes an outer side face 2K and a center hole 2D into which a rotating shaft is inserted so as to transmit a driving force to, and rotate, the disk 1. In this preferred embodiment, the shaft center boss 22 is in the shape of a cylinder including the center hole 2D. In the drawings, the center hole 2D is illustrated as extending through the shaft center boss 22. Alternatively, the center hole 2D may also be closed at the upper end of the shaft center boss 22, i.e., on the top of the turntable 2.

The shaft center boss 22 is disposed in the space defined by the inner side face 2J of the center boss 2A, and is secured by the ribs 23 to the disk mounting section 21 so that the center axis of the center hole 2D of the shaft center boss 22 is aligned with that of the center boss 2A. In this preferred embodiment, the turntable 2 includes six ribs 23. The six ribs 23 join together the outer side face 2K of the shaft center boss 22 and the inner side face 2J of the center boss 2A and are arranged at equiangular intervals.

On the top of the turntable 2, the upper end of the shaft center boss 22 has been depressed by a distance d1 from that of the center boss 2A as shown in FIGS. 2 and 4a–4c. On the bottom of the turntable 2 on the other hand, the lower end of the shaft center boss 22 has protruded by a distance d2 from that of the disk mounting section 21 as shown in FIGS. 3 and 4a–4c.

As shown in FIG. 3, six cylindrical rib supporting bosses 2G have been formed on the bottom of the turntable 2. On the bottom of the turntable 2, the ribs 23 are extended radially and connected to the rib supporting bosses 2G, respectively. In such a structure, the ribs 23 can have their mechanical strength increased. Thus, it is possible to avoid an unwanted situation where the breakage or deformation of the ribs 23 tilts the shaft center boss 22 from the intended rotation axis of the turntable 2. As shown in FIGS. 4b and 4c, a protrusion 2L has been formed at the bottom of each rib supporting boss 2G by a gate through which a resin is injected while the turntable 2 is molded out of the resin.

Each of the ribs 23 extends in the axial direction of the shaft center boss 22. Accordingly, a through hole 2F is formed as a space that is surrounded by two adjacent ribs 23, the inner side face 2J of the center boss 2A and the outer side face 2K of the shaft center boss 22. In this preferred embodiment, six such through holes 2F are formed. These through holes 2F are also formed at equiangular intervals.

Preferred sizes of the turntable 2 will be described with reference to FIGS. 4a–4c. The disk mounting section 21 preferably has an outer diameter $\phi 1$ of about 25 mm to about 35 mm. The center boss 2A preferably has an outer diameter $\phi 2$ of about 14 mm to about 16 mm and an inner diameter $\phi 3$ of about 5 mm to about 10 mm. The shaft center boss 22 preferably has an outer diameter $\phi 4$ of about 3.5 mm to about 6.0 mm and an axial length d3 of about 8 mm to about 15 mm. The distance d1 between the top of the center boss 2A and that of the shaft center boss 22 is preferably from about 0.3 mm to about 2.0 mm. On the other hand, the distance d2 between the bottom of the shaft center boss 22 and that of the disk mounting section 21 is preferably from about 2 mm to about 5 mm. The rib supporting bosses 2G preferably have an outer diameter $\phi 5$ of about 2.5 mm to about 4.0 mm. On the bottom of the disk mounting section 21, the distance d5 between the bottom of each rib 23 and that of the shaft center boss 22 is preferably from about 0 mm to about 2 mm. This distance d5 is provided so that the ribs 23 or rib supporting bosses 2G will not come into contact with the motor 4 even if the ribs 23 or rib supporting bosses 2G have been shaped with poor precision.

Also, the thickness t1 of the shaft center boss 22 is preferably greater than the thickness t2 of the ribs 23. In that case, particularly when these members are molded with a die, it does not take a longer time to cool the material inside the ribs 23 than the shaft center boss 22. Accordingly, it is possible to reduce the size of the sink marks to be created on the inner side face of the shaft center boss 22 when the material inside the ribs 23 cools and shrinks. In this preferred embodiment, the thicknesses t1 and t2 are preferably from about 0.8 mm to about 1.5 mm and from about 0.5 mm to about 1.2 mm, respectively.

Figure 5:
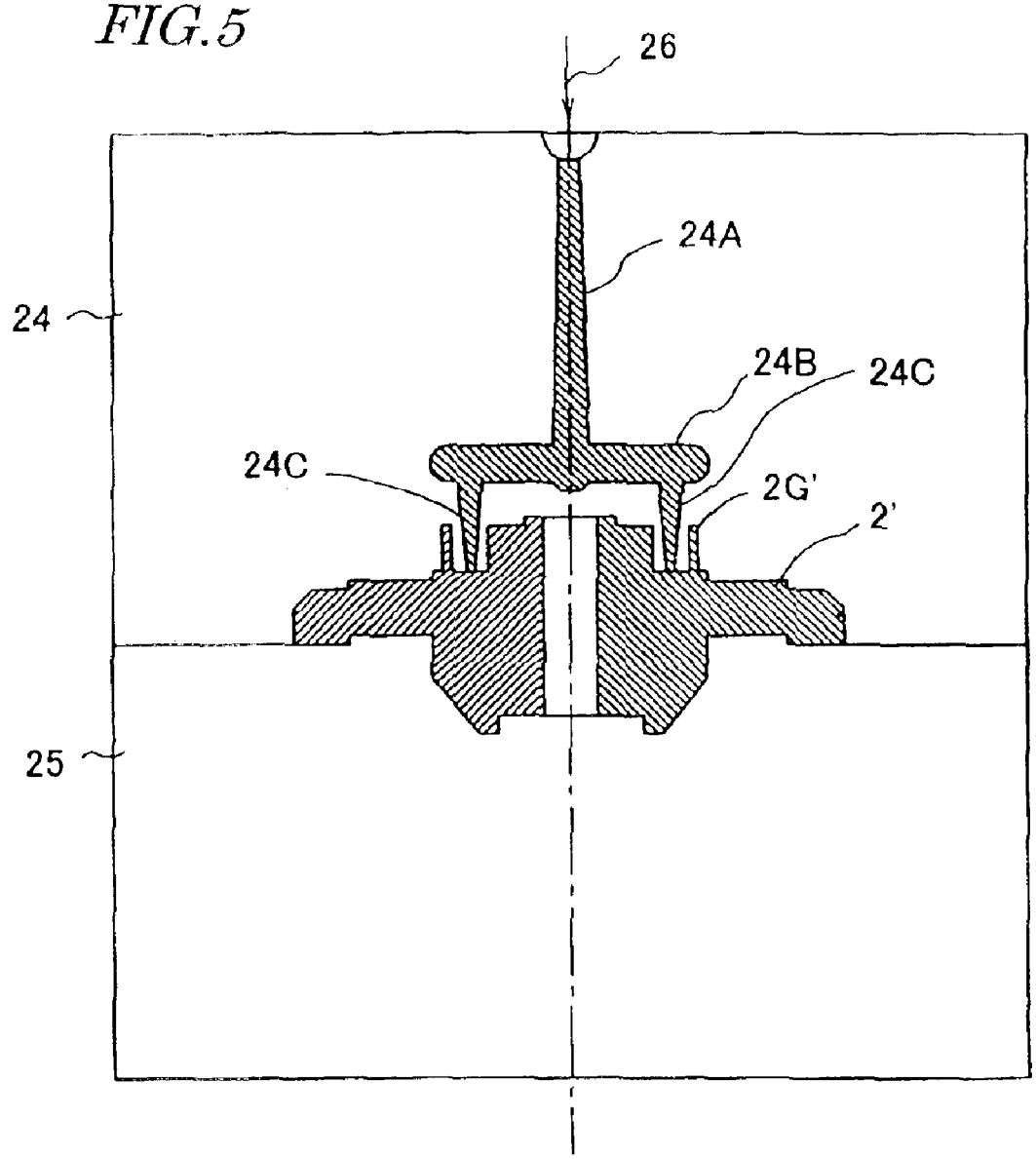
FIG. 5 is a cross-sectional view illustrating a die assembly for use to make the turntable shown in FIGS. 2 and 3.

All of the members of the turntable 2 are preferably molded together out of resin, metal or any other suitable material. In this preferred embodiment, the turntable 2 is molded out of a resin. FIG. 5 schematically illustrates a cross section of a die assembly for use to make the turntable 2. In making the turntable 2, upper and lower dies 24 and 25 may be used, for example. In this case, the upper die 24 is fixed while the lower die 25 is movable. The space 2' defined by the upper and lower dies 24 and 25 has a shape corresponding to the outer shape of the turntable 2. To inject a resin into the space 2', a sprue 24A and a runner 24B connected to the sprue 24A are provided for the upper die 24. A plurality of gates 24C is formed near the outer periphery of the runner 24B to inject the resin from the vicinity of the spaces 2G' corresponding to the rib supporting bosses 2G into the space 2'. That is to say, the gates 24C are provided for the six regions corresponding to the rib supporting bosses 2G.

Soon after the resin 26 has been injected through the sprue 24A, the resin 26 is uniformly injected into the space 2' by way of the runner 24B and then the six gates 24C. In this manner, the resin 26 can be equally distributed to all corners of the space 2'.

After the resin 26 injected into the space 2' has been cooled and solidified, the upper and lower dies 24 and 25 are removed and then portions of the resin 26 that have been solidified at the gates 24C are also removed, thereby obtaining the turntable 2. As a result, the protrusions 2L shown in FIGS. 4b and 4c are formed at the six points that have been connected to the gates 24C.

Figure 6:
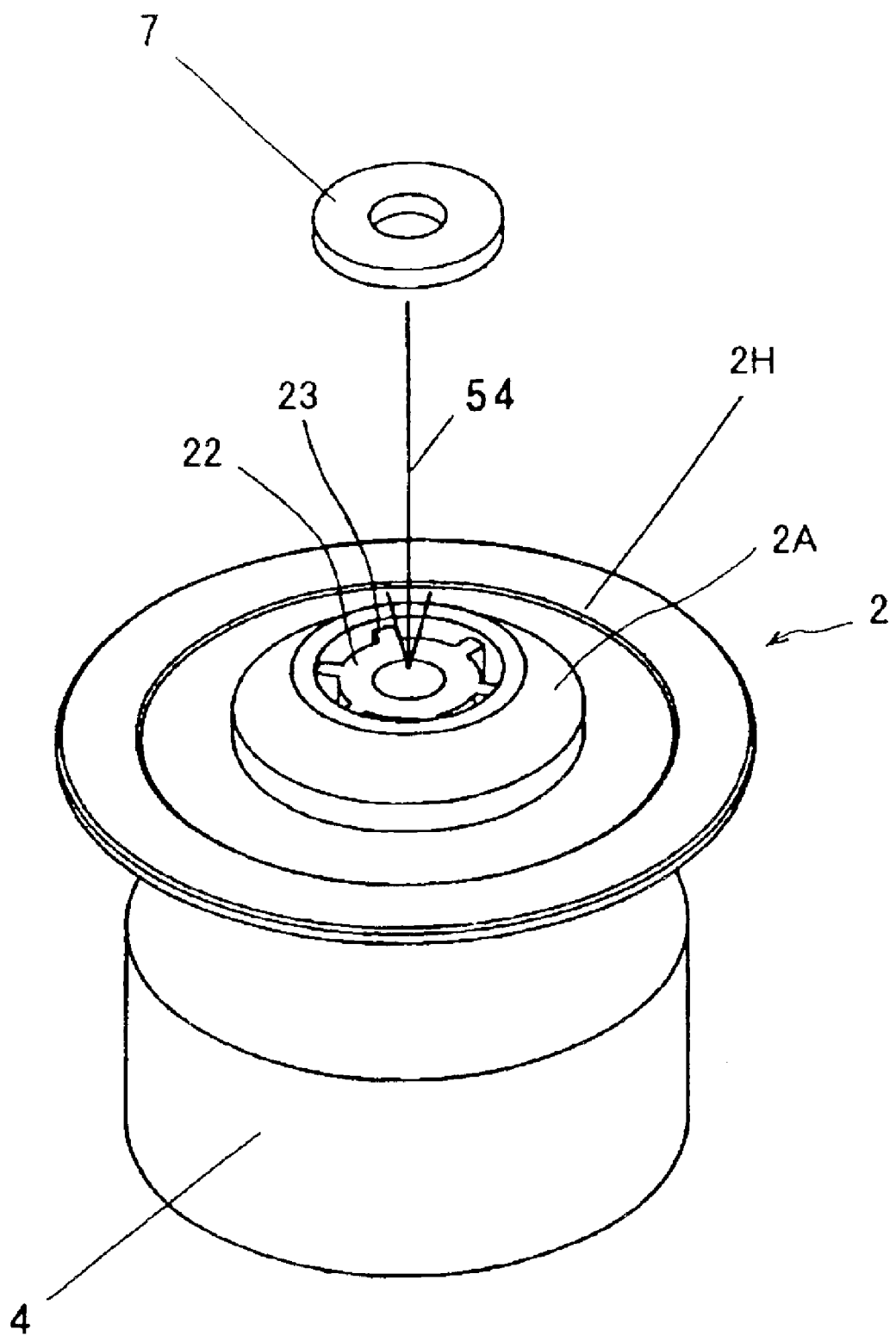
FIG. 6 is a perspective view illustrating how a yoke and a motor are fitted with the turntable shown in FIGS. 2 and 3.

Thereafter, as shown in FIG. 6, the shaft of the motor 4 is inserted into the center hole 2D of the shaft center boss 22. The shaft and the shaft center boss 22 are normally press-fitted with each other by an interference fit technique. Alternatively, the shaft center boss 22 may also be transition-fitted with the shaft using an additional adhesive, for example. After the turntable 2 has been fitted with the motor 4 in this manner, the yoke 7 is attached to the top of the center boss 2A in the direction 54. Furthermore, as shown in FIG. 1, the read/write head 5 and other members are arranged at their appropriate positions to complete the disk drive 31.

In the disk drive 31 of this preferred embodiment, the unwanted effects of the sink marks created during the resin molding process can be reduced and the flutter of the disk 1 on the turntable 2 can also be decreased. These features will be described in further detail below.

Figure 7:
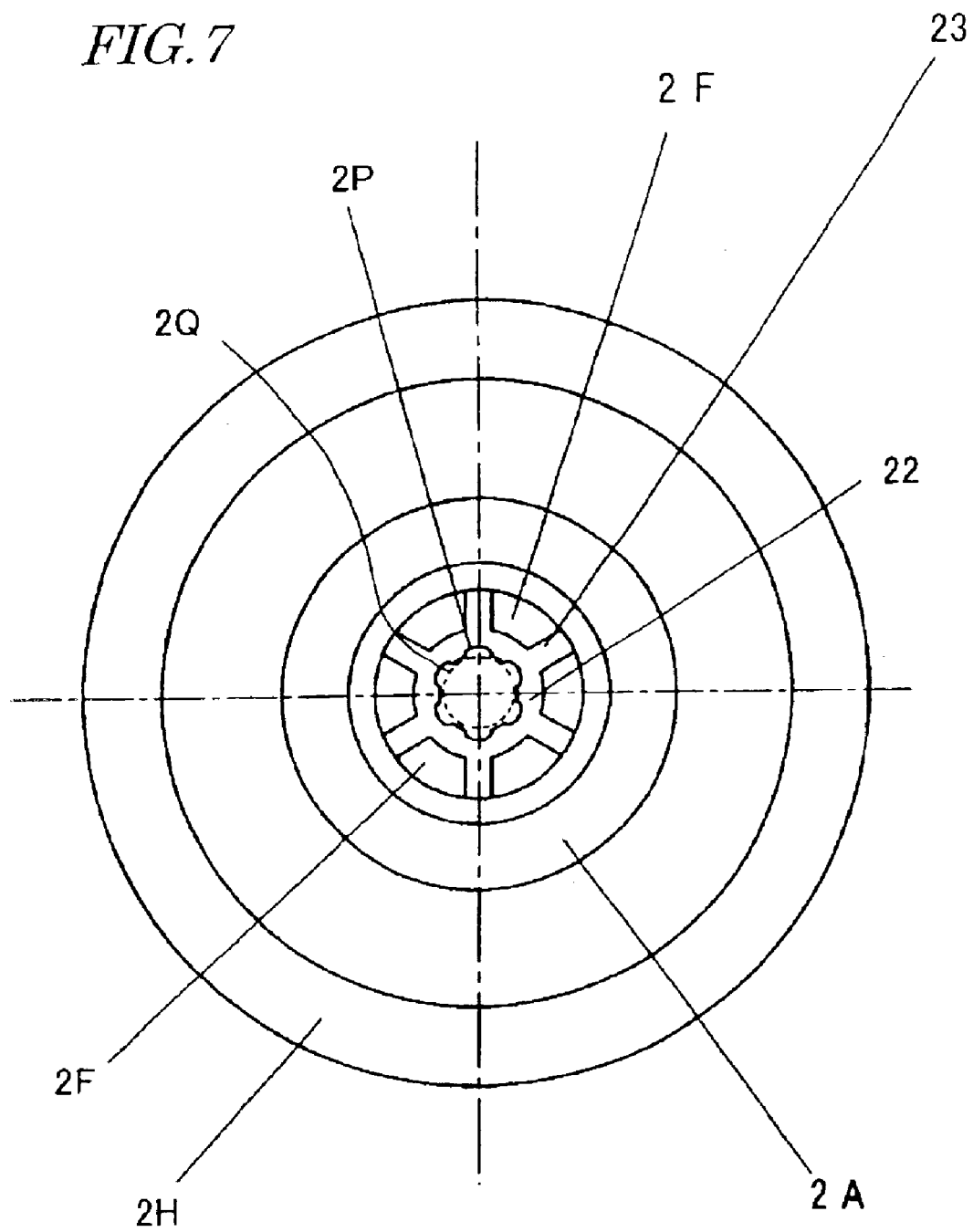
FIG. 7 is a plan view illustrating the turntable shown in FIGS. 2 and 3 to a larger scale.

FIG. 7 is a plan view schematically illustrating the top of the turntable 2 of the disk drive 31 to a larger scale. As shown in FIG. 7, sink marks 2P (i.e., concave portions) have been created at respective parts on the inner side face of the center hole 2D of the shaft center boss 22 to which the ribs 23 have been joined. The sink marks 2P illustrated in FIG. 7 are exaggerated so as to make the sink marks 2P easily recognizable. Actually, though, these sink marks 2P have a depth of about 25 $\mu$m. Those parts at which the ribs 23 and the shaft center boss 22 are joined together have an increased resin thickness in the radial direction. Accordingly, such sink marks 2P are created on the inner side face of the shaft center boss 22.

However, no such sink marks 2P are created at the other parts on the inner side face of the shaft center boss 22 to which no ribs 23 are joined, i.e., the parts adjacent to the through holes 2F that have been formed between the inner side face 2J of the center boss 2A and the outer side face 2K of the shaft center boss 22. Accordingly, those parts with no sink marks 2P have not been displaced from their original positions on the inner side face of the center hole 2D as indicated by the dashed circle 2Q in FIG. 7. The number of those parts with no sink marks 2P is three or more. Thus, a circle inscribed in those parts with no sink marks 2P is determined automatically. That is to say, the position at which the shaft of the motor 4 is inserted into the center hole 2D is also determined automatically. As a result, the shaft can be positioned easily. For this reason, the center axis of the shaft does not shift from that of the center hole 2D. Thus, it is possible to avoid the unwanted situation where the center axis of the motor shaft inserted is tilted or decentered with respect to that of the turntable 2. Consequently, using this turntable 2, the disk 1 being rotated by the motor 4 will not flutter.

In addition, since the ribs 23 are arranged at equiangular intervals around the outer side face 2K of the shaft center boss 22, the sink marks 2P are also created at the same equiangular intervals along the inner side face of the shaft center boss 22. In the same way, those parts with no sink marks 2P are also left on the inner side face of the shaft center boss 22 at the equiangular intervals. Accordingly, when the shaft of the motor 4 is inserted into the center hole 2D, those parts on the inner side face of the shaft center boss 22 that come into contact with the shaft (i.e., the parts with no sink marks 2P) are also equally arranged around the entire circumference of the shaft. As a result, the shaft will not be tilted.

Furthermore, as shown in FIGS. 4a–4c, these ribs 23 are joined with the shaft center boss 22 almost along the length of the center hole 2D. Accordingly, the sink marks 2P are also created on the inner side face of the shaft center boss 22 substantially along the length of the center hole 2D. In the same way, the parts with no sink marks 2P are also left on the inner side face of the shaft center boss 22 virtually along the length of the center hole 2D. For that reason, when the shaft of the motor 4 is inserted into the center hole 2D, the shaft will not be tilted at a midpoint of the center hole 2D. Thus, decentering, waving or fluttering of the turntable 2 with respect to the shaft of the motor 4 is suppressible. As a result, the disk 1 can be spun highly accurately.

Figure 8:
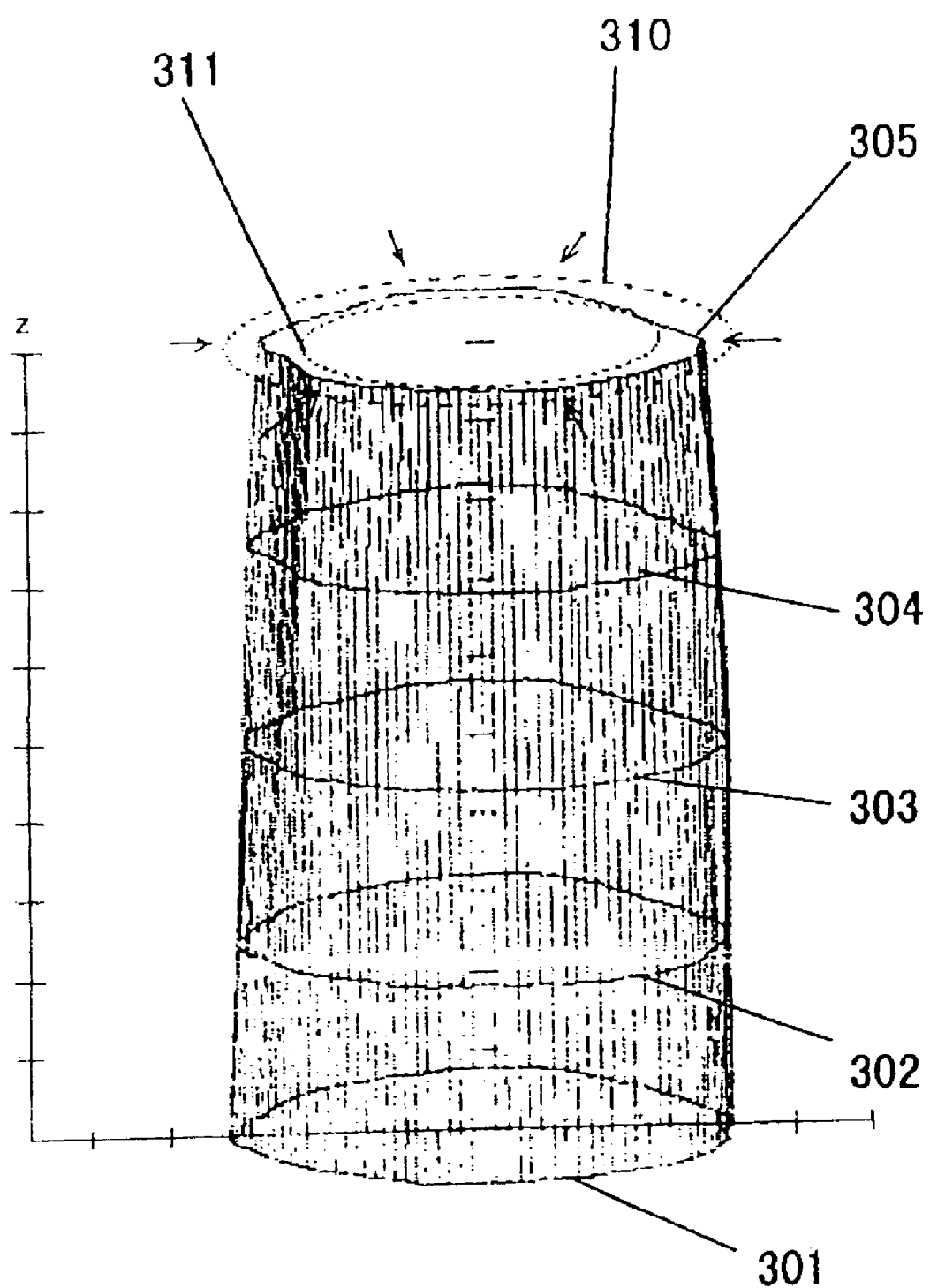
FIG. 8 illustrates a three-dimensional shape as measured for the center hole of the turntable shown in FIGS. 2 and 3.
Figure 9:
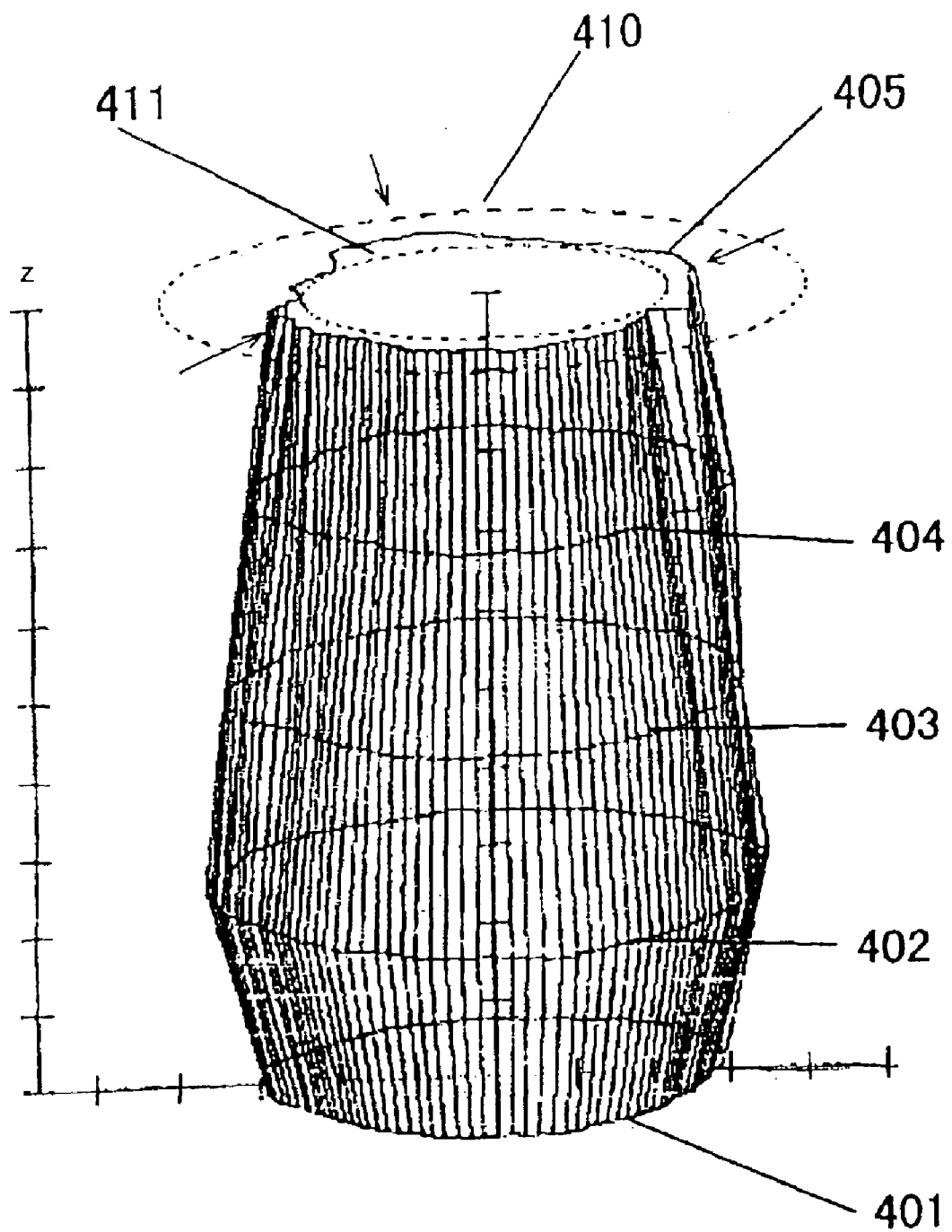
FIG. 9 illustrates a three-dimensional shape as measured for the center hole of a turntable for use in a conventional disk drive.

FIG. 8 illustrates the circularity of the center hole 2D, which was measured as representing a geometric shape of the center hole 2D with a three-dimensional shape measurer. On the other hand, FIG. 9 illustrates a circularity measured for the center hole 102C of the conventional turntable 102 shown in FIGS. 15 through 19. In FIGS. 8 and 9, the top of the turntables 2 and 102 corresponds to the top of these drawings. In FIG. 8, positions on the inner side face of the center hole 2D are measured along the circumference thereof between two points 301 and 305, thereby obtaining five loci. Next, multiple lines crossing the loci at right angles are drawn to complement the shape between the points. In this manner, the inner side facial shape of the center hole 2D is illustrated in FIG. 8. The inner side facial shape of the center hole 102C as measured in a similar manner between points 401 and 405 is illustrated in FIG. 9. The inscribed circles 310 and 410 shown in FIGS. 8 and 9 have the greatest diameters among the loci obtained between the points 301 and 305 and among the loci obtained between the points 401 and 405, respectively. On the other hand, the inscribed circles 311 and 411 shown in FIGS. 8 and 9 have the smallest diameters among those two sets of loci. That is to say, the difference in radius between the circles 310 and 311 represents the circularity of the center hole 2D, while the difference in radius between the circles 410 and 411 represents the circularity of the center hole 102C.

As can be seen from FIG. 8, the sink marks 2P are created (i.e., the space expands) at the parts indicated by the arrows on the center hole 2D of the turntable 2 according to this preferred embodiment. However, it can also be seen that those parts with the sink marks 2P are arranged almost at equiangular intervals along the inner side face of the center hole 2D as already described. In FIG. 8, the cross-sectional shape of the center hole 2D is deformed due to the creation of the sink marks to almost the same degree at any level between the points 301 and 305. That is to say, the center hole 2D shows a small variation in cross-sectional shape in the axial direction thereof. Accordingly, the difference in radius between the greatest and smallest inscribed circles 310 and 311 of the center hole 2D is relatively small. In the example illustrated in FIG. 8, the radial difference is about 5 $\mu$m.

On the other hand, as can be clearly seen from FIG. 9, the sink marks are irregularly created on the respective cross sections of the center hole 102C of the conventional turntable 102. For example, at the point 405, great sink marks are created in three parts at inequiangular intervals as indicated by the three arrows. Also, the sink marks have mutually different depths among the respective points 401 to 405. Accordingly, although the cross section of the center hole 102C once expands at the point 402 compared to the bottom point 401, the cross section shrinks again toward the top (i.e., toward the top point 405). Thus, the cross section at the point 405 is smaller in area than the counterpart at the point 401. As a result, the difference in radius between the greatest and smallest inscribed circles 410 and 411 of the center hole 102C is relatively great. In the example illustrated in FIG. 9, the radial difference is about 10 $\mu$m.

As described above, according to this preferred embodiment of the present invention, the structure of the turntable is designed in such a manner as to prevent the shape precision of its center hole from being affected by the sink marks created during the resin molding process. Thus, decentering, waving or fluttering of the turntable 2 with respect to the shaft of the motor 4 is suppressible. As a result, the disk 1 can be rotated highly accurately.

The disk 1 can be rotated highly accurately without allowing the turntable 2 to flutter. Accordingly, there is no need to use an expensive, high-tech head for performing complicated positional control to read and write information even from/on a fluttering disk just as intended. In other words, a head with a simple control mechanism may be used for the disk drive according to this preferred embodiment of the present invention. Thus, the cost of the head unit can be reduced, and therefore, the overall cost of the disk drive can also be cut down eventually.

Furthermore, according to this preferred embodiment of the present invention, a center hole can be directly formed by a die molding process so as to have a high shape precision. Accordingly, there is no need to perform an additional process step for increasing the precision of the center hole. Thus, the turntable can be mass-produced at a lower cost.

In the preferred embodiment described above, the inner side face 2J of the center boss 2A and the outer side face 2K of the shaft center boss 22 have cylindrical shapes. However, the inner and outer side faces 2J and 2K may have non-cylindrical shapes. For example, these side faces 2J and 2K may also have hexagonal or any other polygonal cross-sectional shapes. In the same way, the rib supporting bosses 2G may also have a polygonal cross-sectional shape. Optionally, the rib supporting bosses 2G may be omitted. In that case, the ribs 23 may be extended and directly joined with the bottom of the disk mounting section 21.

Embodiment 2

The disk drive 31 of the first specific preferred embodiment of the present invention described above uses the clamper 3 and the yoke 7 to fix the disk 1 on the turntable 2. On the other hand, in a disk drive 32 according to a second specific preferred embodiment of the present invention, the turntable itself includes a mechanism for fixing the disk thereon. A similar mechanism for fixing a disk on a turntable is disclosed in Japanese Laid-Open Publication No. 8-335351, for example.

Figure 10:
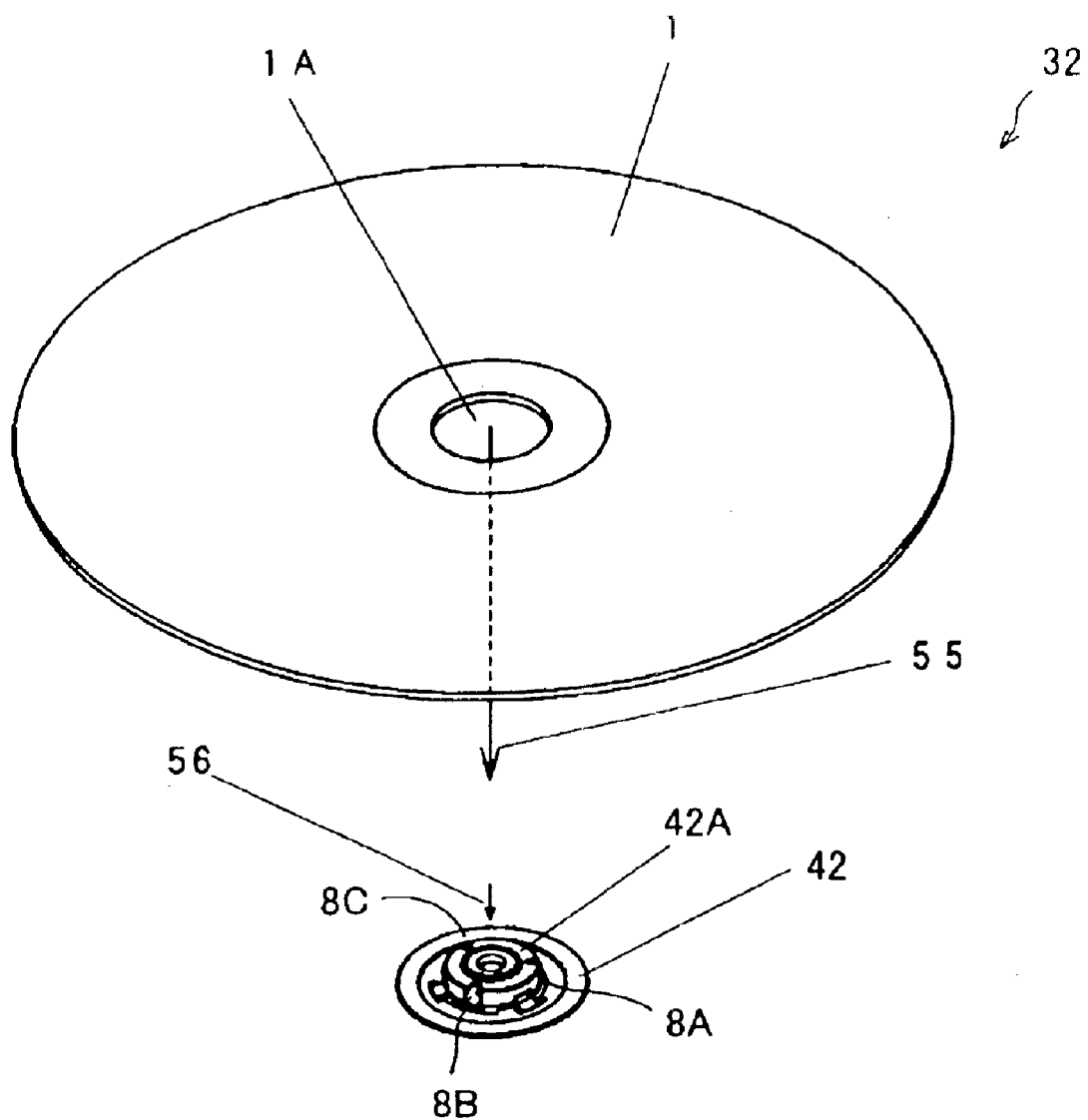
FIG. 10 is a perspective view schematically illustrating a part of a disk drive according to a second specific preferred embodiment of the present invention near its turntable.

As shown in FIG. 10, when the disk 1 is moved downward as indicated by the arrow 55 and mounted on a turntable 42 of the disk drive 32 according to this preferred embodiment, three spherical bodies 8A, 8B and 8C, which are exposed through the outer side face 42M of a center boss 42A and which constitute part of a force-applying mechanism, forces the disk 1 onto a disk mount surface 42H and thereby fixes it on the turntable 42.

Figure 11:
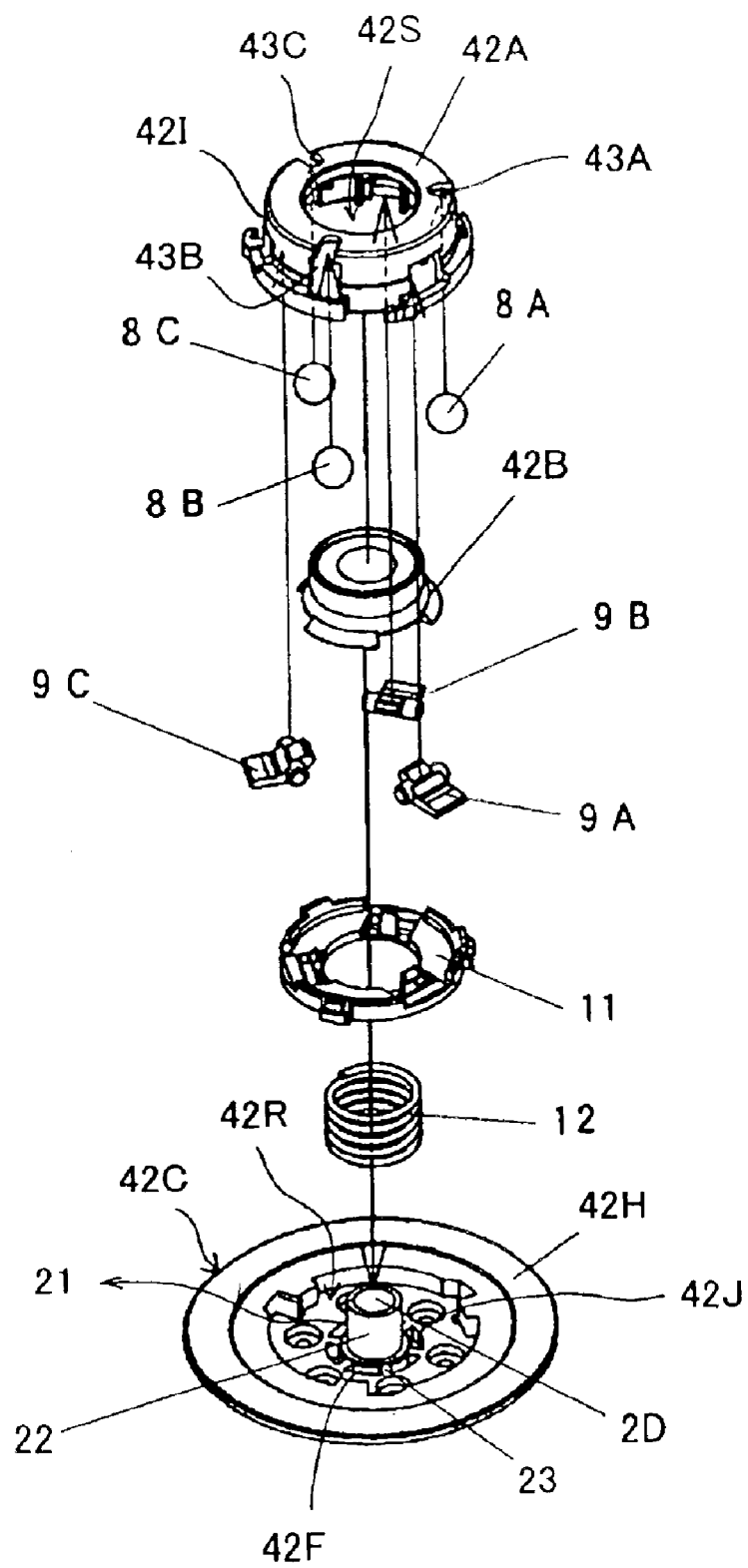
FIG. 11 is an exploded perspective view of the turntable shown in FIG. 10.

The structure of this turntable 42 will be described in detail with reference to FIG. 11. In the preferred embodiment illustrated in FIG. 11, the disk mounting section includes the center boss 42A and a disk mounting base 42C.

The disk mounting base 42C includes the disk mount surface 42H and an inner side face 42J. The shaft center boss 22 has been inserted into the space defined by the inner side face 42J. The six ribs 23 are joined to the inner side face 42J and the outer side face 2K of the shaft center boss 22. Six through holes 42F are also formed between the ribs 23. Although not shown in FIG. 11, the rib supporting bosses, having the same structure as the counterparts shown in FIG. 3, are also formed on the bottom of the disk mounting base 42C. In this preferred embodiment, the disk mounting base 42C, ribs 23 and shaft center boss 22 have been molded together out of a resin or a metal using a die.

The outer side face 42M of the center boss 42A is provided with three openings 43A, 43B and 43C at equiangular intervals. These openings 43A, 43B and 43C are wide enough to partially expose the spherical bodies 8A, 8B and 8C of steel.

The center boss 42A has a center hole 42S on the top, through which part of a push button 42B protrudes. A spring 12 to be inserted into the shaft center boss 22 applies a force to the push button 42B. Furthermore, disk uplifting levers 9A, 9B and 9C are arranged at equiangular intervals under the center boss 42A. A cover 11 for storing and retaining the push button 42B, spherical bodies 8A, 8B and 8C and disk uplifting levers 9A, 9B and 9C in the internal space of the center boss 42A is provided at the bottom of the center boss 42A.

Figure 12:
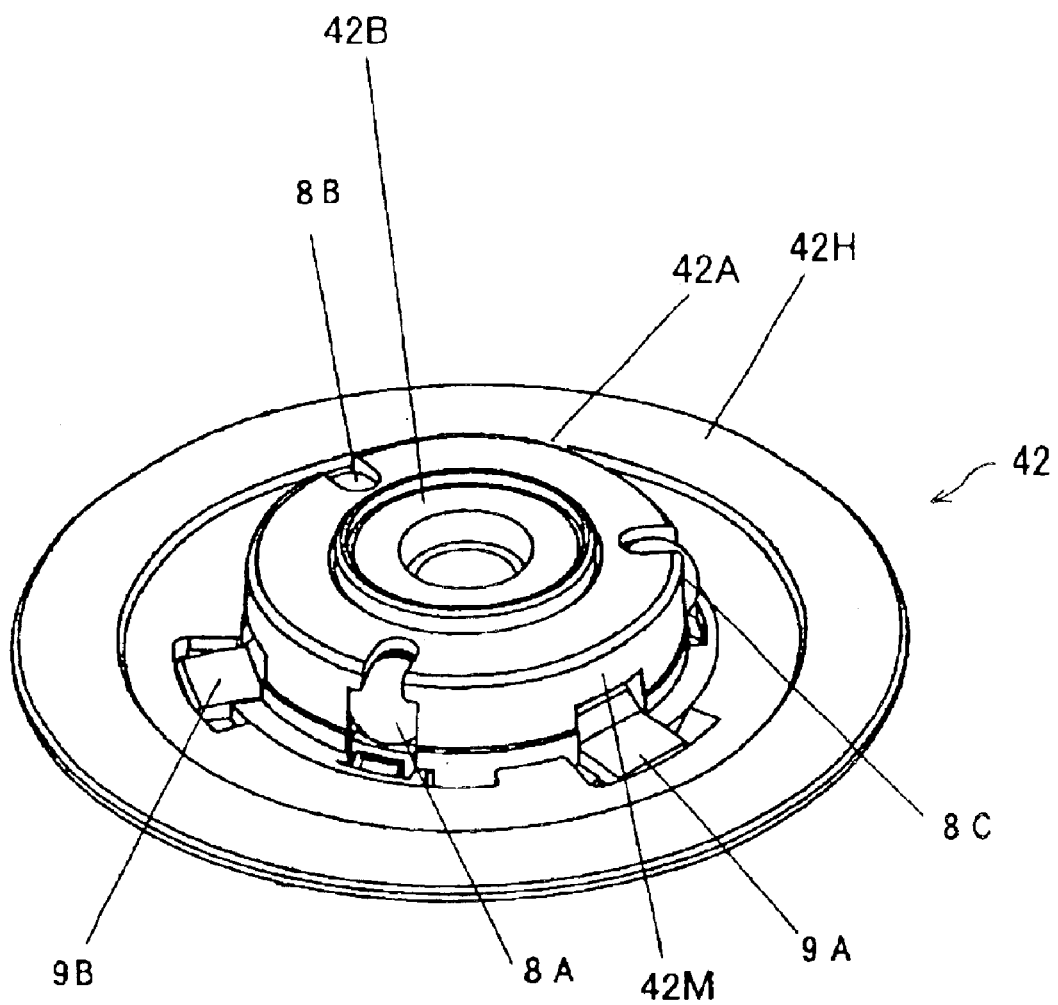
FIG. 12 is a perspective view illustrating the turntable shown in FIG. 10 to a larger scale.
Figure 13A:
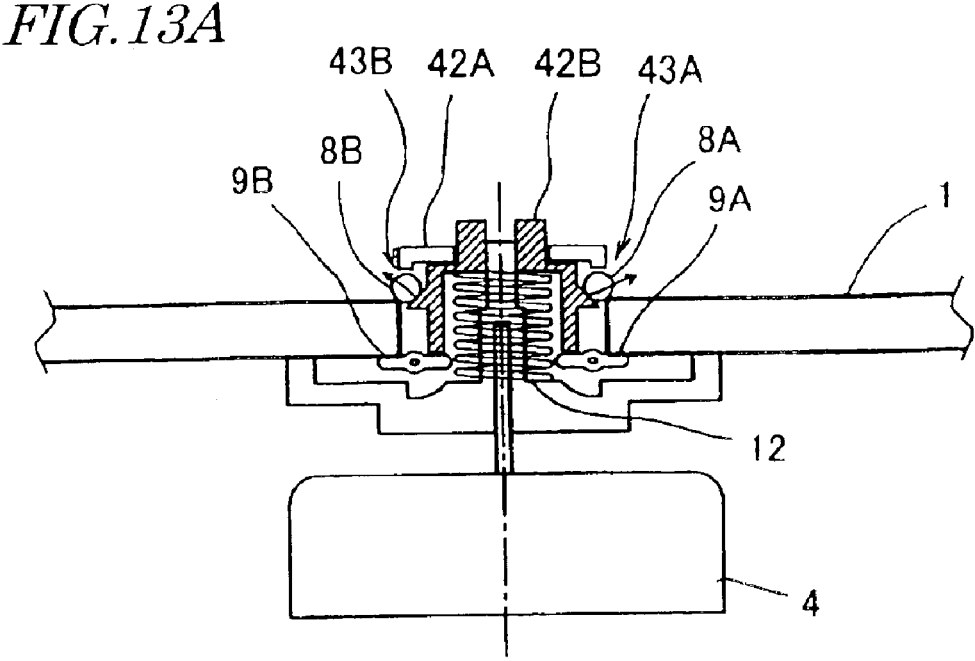
FIGS. 13A and 13B are cross-sectional views respectively illustrating a state in which a disk has been mounted on the turntable shown in FIG. 10 and a state in which the disk is being removed from the turntable.
Figure 13B:
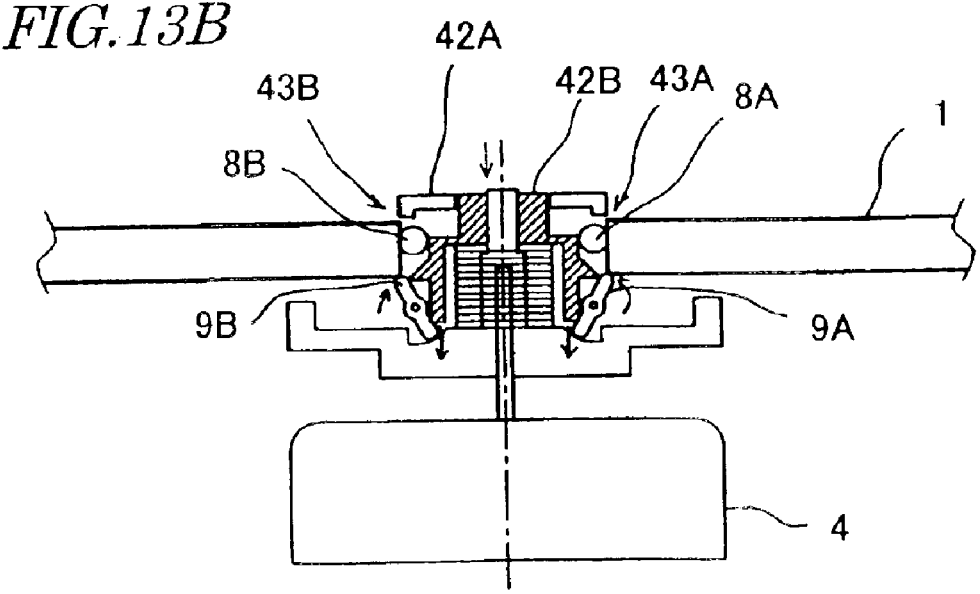
Figure 14:
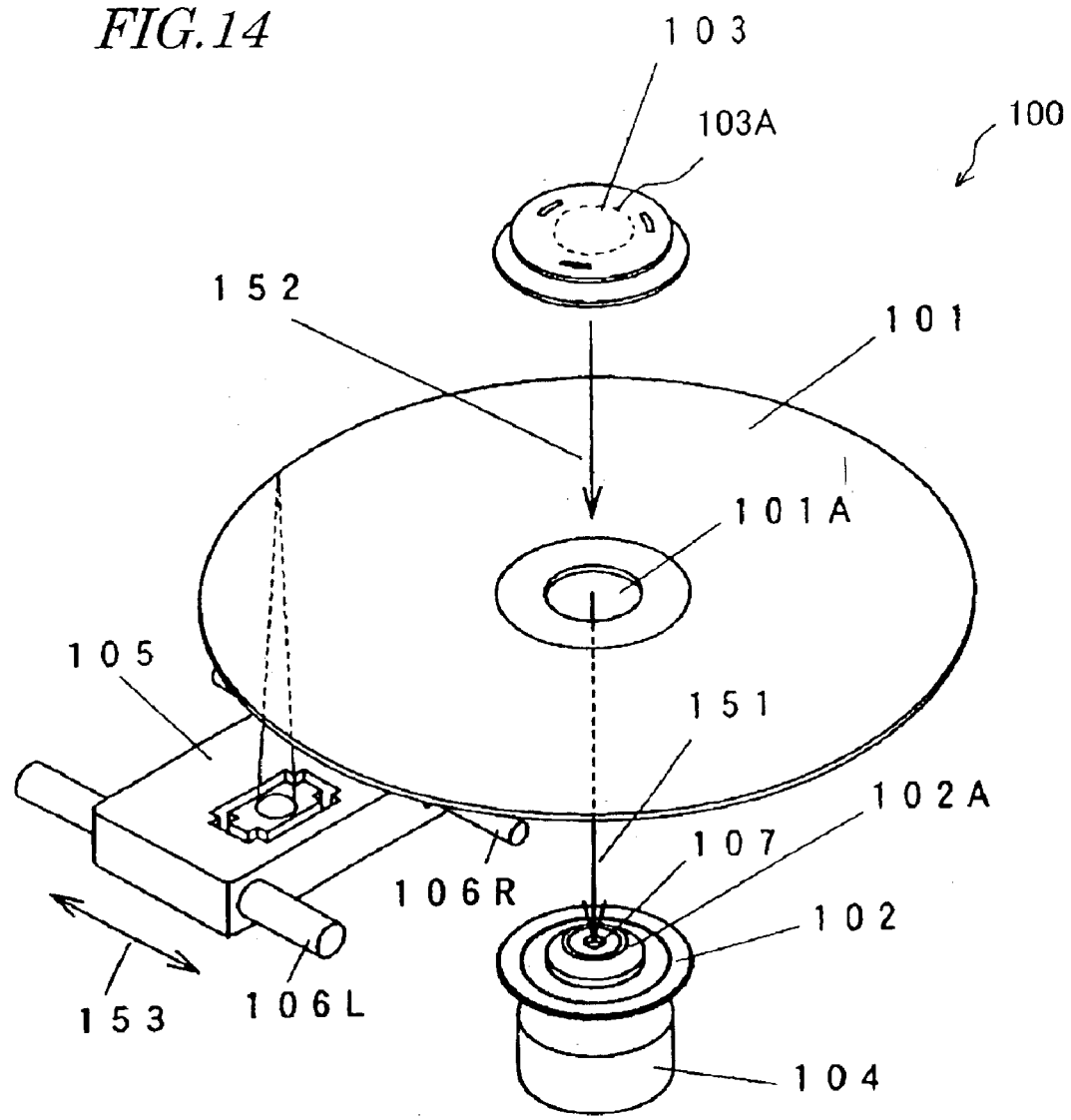
FIG. 14 is a perspective view schematically illustrating a conventional disk drive.
Figure 15:
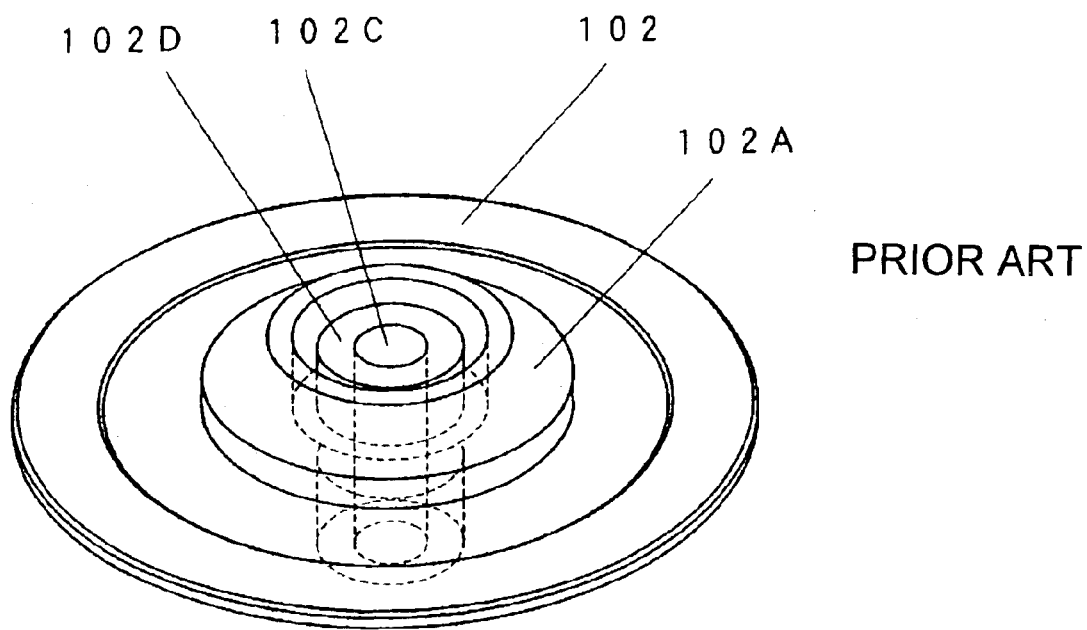
FIG. 15 is a perspective view of the turntable of the disk drive shown in FIG. 14 as viewed from above the turntable.
Figure 16:
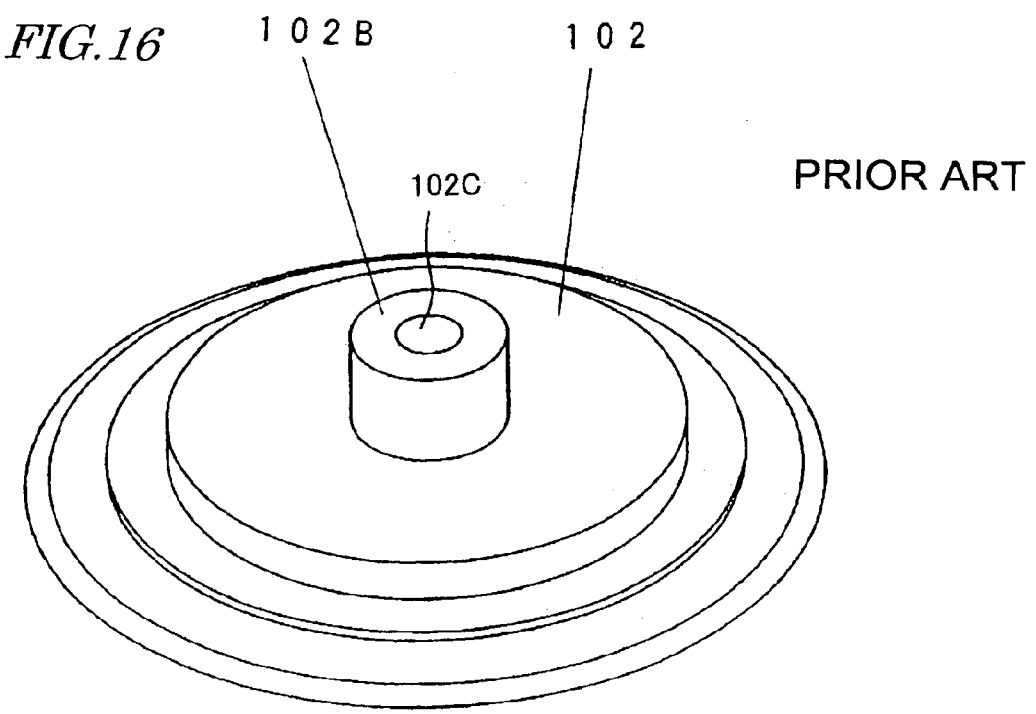
FIG. 16 is a perspective view of the turntable of the disk drive shown in FIG. 14 as viewed from below the turntable.
Figures 17A, 17B, 17C:
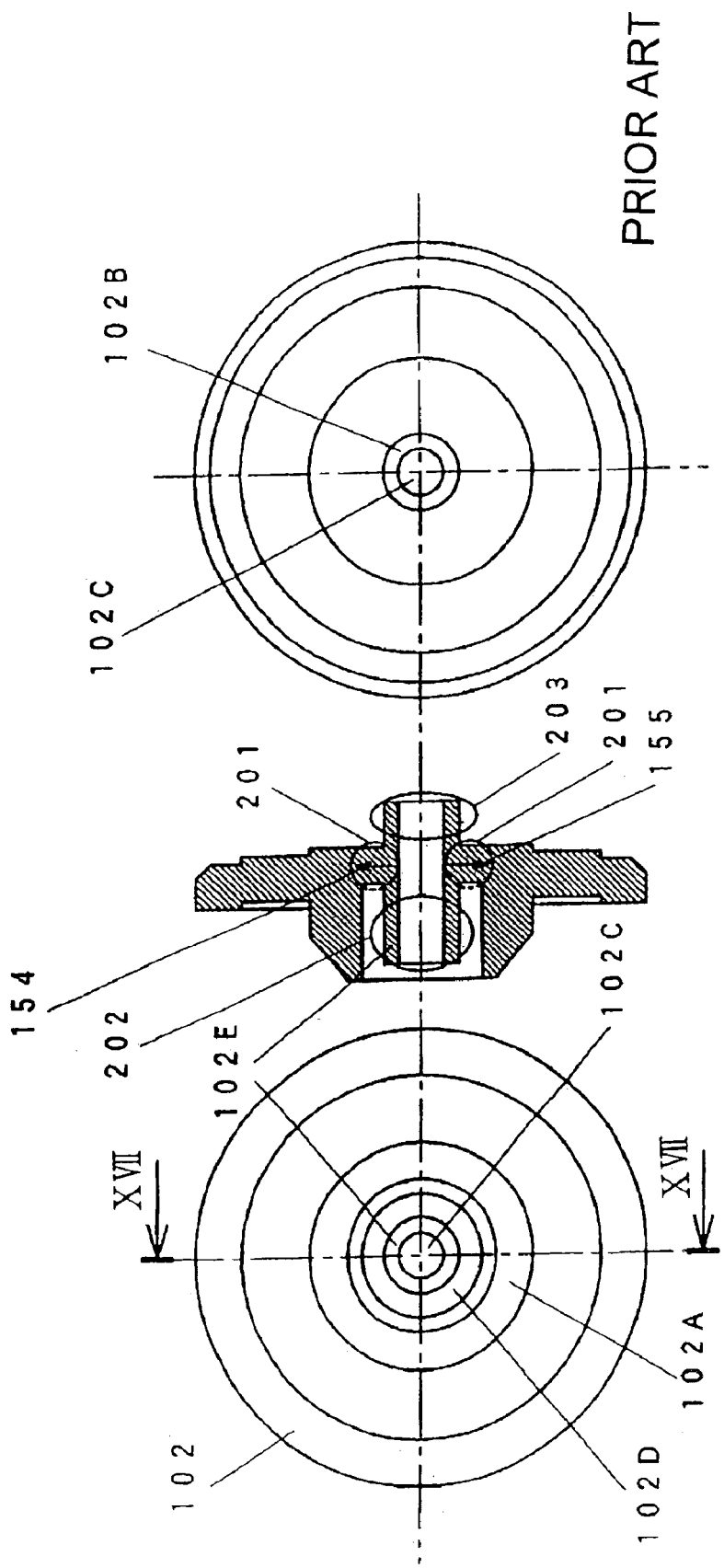
FIGS. 17a–17c illustrate projections (FIGS. 17a and 17c) and a cross-sectional view (FIG. 17b) of the turntable shown in FIGS. 15 and 16.
Figure 18:
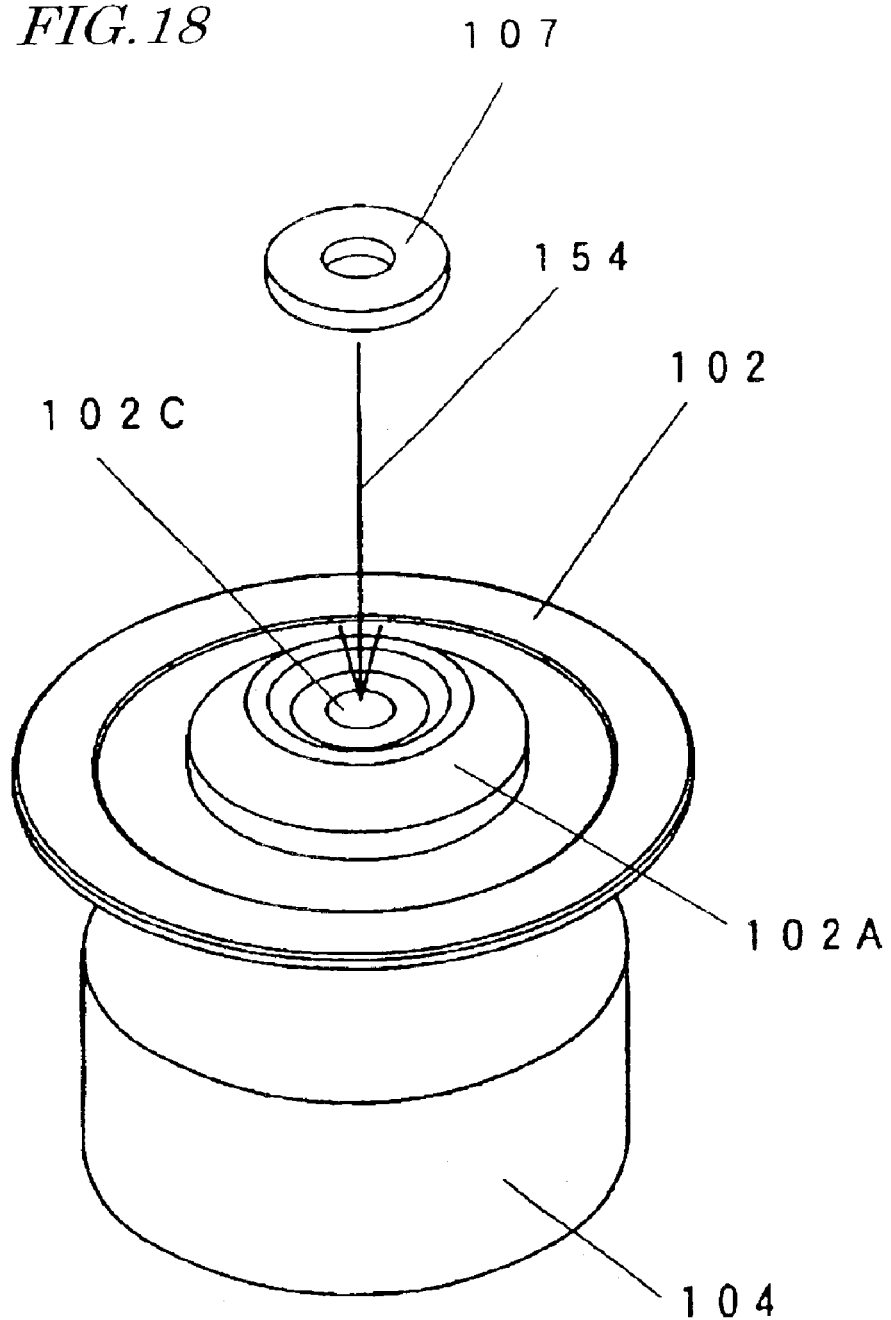
FIG. 18 is a perspective view illustrating how a yoke and a motor are fitted with the turntable shown in FIGS. 15 and 16.
Figure 19:
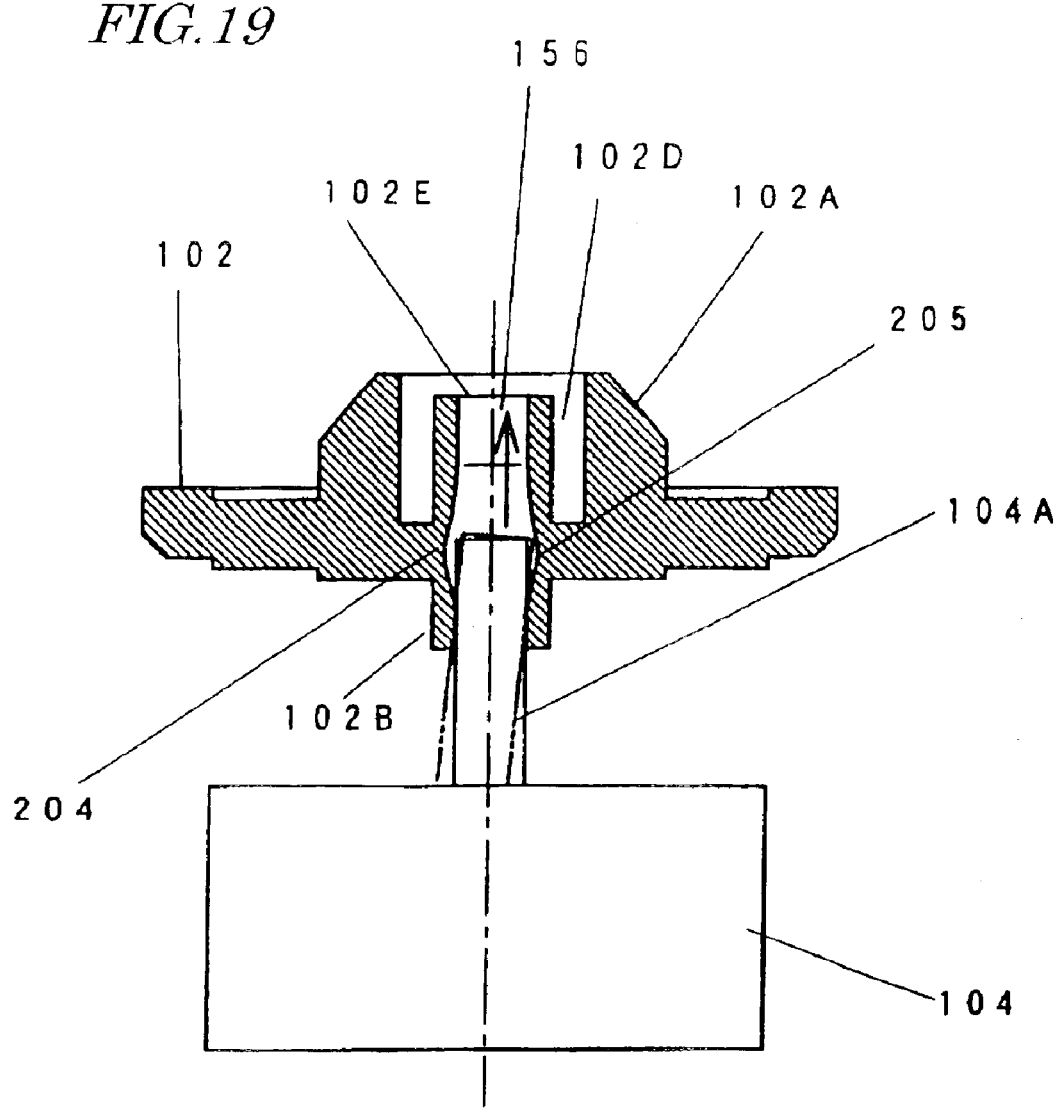
FIG. 19 is a cross-sectional view illustrating a state in which the motor has been fitted with the turntable shown in FIGS. 15 and 16.

FIG. 12 is a perspective view of the turntable 42 as viewed from above the turntable 42. FIGS. 13A and 13B are cross-sectional views illustrating a state in which the disk 1 has been mounted on the turntable 42 and a state in which the disk 1 is being removed from the turntable 42, respectively. Although FIG. 13A illustrates a state in which the disk 1 has been mounted on the turntable 42, the respective members are in the same positions even while no disk is mounted on the turntable 42. Accordingly, it will be described with reference to FIGS. 12 and 13A how and where these members are disposed inside the center boss 42A.

As shown in FIG. 13A, the spring 12 has applied an upward force onto the push button 42B. In this case, the spherical bodies 8A, 8B and 8C are respectively forced onto the openings 43A, 43B and 43C of the center boss 42A by way of slopes of the push button 42B. As a result, as shown in FIG. 12, the spherical bodies 8A, 8B and 8C are partially exposed through the openings 43A, 43B and 43C, respectively.

The disk uplifting levers 9A, 9B and 9C are supported on respective bearings (not shown) that have been formed as fulcrums by the cover 11 and the bottom of the center boss 42A. Thus, as shown in FIGS. 12 and 13A, the disk uplifting levers 9A, 9B and 9C lie substantially parallel to the disk mount surface 42H.

In mounting the disk 1 onto the turntable 42, the disk 1 is pressed against the disk mount surface 42H with its center hole 1A engaged with the center boss 42A. At this time, the spherical bodies 8A, 8B and 8C are pressed toward the center of the center boss 42A by the inner side face or edge defining the center hole 1A of the disk 1. Also, if any of the disk uplifting levers 9A, 9B and 9C has lifted for some reason, then the disk 1 pushes the lever down toward the disk mount surface 42H. Once the disk 1 has come into contact with the disk mount surface 42H completely as shown in FIG. 13A, the spherical bodies 8A, 8B and 8C are respectively forced toward the openings 43A, 43B and 43C of the center boss 42A by way of the slopes of the push button 42B. As a result, these spherical bodies 8A, 8B and 8C force the disk 1 down onto the disk mount surface 42H. In this manner, the disk 1 is fixed on the turntable 42.

To remove the disk 1 from the turntable 42, the push button 42B is pressed down as shown in FIG. 13B. Then, the bottom of the push button 42B presses one end of the disk uplifting levers 9A, 9B and 9C down. As a result, the other end of the disk uplifting levers 9A, 9B and 9C lifts the disk 1 up. Once the push button 42B has been pressed down, the slopes of the push button 42B are separated from the spherical bodies 8A, 8B and 8C. Accordingly, the spherical bodies 8A, 8B and 8C are released from the pressing force. At the same time, the inner side face or the edge of the center hole 1A of the disk 1 being uplifted forces the spherical bodies 8A, 8B and 8C toward the center of the center boss 42A. Thereafter, the disk 1 is further lifted up by the disk uplifting levers 9A, 9B and 9C and is eventually disengaged from the center boss 42A. In this manner, the disk 1 can be removed from the turntable 42 easily.

In the second preferred embodiment described above, the turntable 42 includes a mechanism for engaging the disk 1 with the center boss 42A thereof without using the clamper 3 such as that shown in FIG. 1. In this turntable 42, the shaft center boss 22 is also supported by the ribs 23 so as to form the through holes 42F as in the first preferred embodiment. Thus, even though sink marks are created on the inner wall of the center hole 2D of the turntable 42, the shape precision of the center hole 2D is not seriously affected by those sink marks as in the first preferred embodiment.

Particularly in the structure of this second preferred embodiment, the disk fixing and supporting mechanism is provided on the disk mounting base 42C including the center hole 2D, and it is not easy for the shaft of the motor 4 to go through the center hole 2D. Thus, the shaft can barely reach a midpoint of the center hole 2D in the axial direction thereof. In such a situation, the conventional turntable is seriously affected by those sink marks created. In contrast, according to this preferred embodiment, there is just a little variation in the cross-sectional shape of the center hole 2D in the axial direction thereof. Accordingly, decentering, waving or fluttering of the turntable 42 is suppressible advantageously. That is to say, the present invention is even more effectively applicable to a structure such as that described as the second preferred embodiment.

The first and second preferred embodiments of the present invention described above relate to disk drives for optically reading and writing information from/on a disk. However, the present invention is also effectively applicable even to a disk drive of a magnetic or magneto-optical recording type as long as the disk drive performs read and write operations on a disk mounted thereon.

Also, in the first and second preferred embodiments described above, the turntable is formed by molding a resin or metal with a die. However, as long as the shaft center boss is supported at three or more points by a plurality of ribs extending in the axial direction of the boss, the turntable may also be formed by any other shaping process (e.g., plastic molding or forging process). Even so, a higher mechanical precision is achievable for a rotational body as compared to the conventional turntable. Thus, the shaft of a motor can also be fixed and supported stably enough on that alternative turntable.

A turntable according to any of various preferred embodiments of the present invention described above can reduce the unwanted effects of sink marks that are often created on the inner side face of a shaft center boss during a die molding process, thereby increasing the circularity of a center hole defined by the inner side face of the shaft center boss. Accordingly, when the shaft of a motor is inserted into the center hole of the turntable, the shaft will be tilted much less with respect to the center hole. As a result, in reading or writing information from/on a disk that has been mounted on the turntable and is now being rotated by the motor, a disk drive according to any of those preferred embodiments of the present invention can prevent the disk from waving or fluttering.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A turntable for a disk storage medium, the turntable comprising:
   a disk mounting section that includes a disk mount surface, a center boss and an inner side surface, the disk mount surface being used to mount the disk storage medium thereon, the center boss having an outer side face that engages with a center hole of the disk storage medium, the inner side face defining a space that has a center axis aligned with that of the center boss;
   a shaft center boss includes an outer side face and a hole into which a rotating shaft is inserted so as to transmit a driving force to, and rotate, the disk storage medium; and
   a plurality of generally linear ribs extending radially for joining the outer side face of the shaft center boss and the inner side face of the disk mounting section together so that multiple through holes are formed between the outer side face of the shaft center boss and the inner side face of the disk mounting section, the plurality of ribs being sufficiently rigid so that the ribs do not deform during operation of the turntable, wherein the disk mounting section, the shaft center boss, and the plurality of ribs are integrally molded out of one of resin and metal.

2. The turntable of claim 1, wherein each said rib is less thick than the shaft center boss.

3. The turntable of claim 1, wherein the center boss comprises a member made of a ferromagnetic material.

4. A disk drive comprising:
   the turntable for the disk storage medium as recited in claim 3;
   a read/write head for reading and/or writing information from/on the disk storage medium;
   a driving unit that includes a rotating shaft that has been inserted into the hole of the shaft center boss of the turntable; and
   a clamp including a magnetic body.

5. The disk drive of claim 4, wherein the rotating shaft has been press-fitted with the shaft center boss.

6. A disk drive comprising:
   the turntable for the disk storage medium as recited in claim 1;
   a read/write head for reading and/or writing information from/on the disk storage medium; and
   a driving unit that includes a rotating shaft that has been inserted into the hole of the shaft center boss of the turntable.

7. The disk drive of claim 6, wherein the rotating shaft has been press-fitted with the shaft center boss.

8. A turntable for a disk storage medium, the turntable comprising:
   a disk mounting section that includes a disk mount surface, a center boss, a bottom, and an inner side surface, the disk mount surface being used to mount the disk storage medium thereon, the center boss having an outer side face that engages with a center hole of the disk storage medium, the inner side face defining a space that has a center axis aligned with that of the center boss, the bottom including a plurality of rib supporting bosses;
   a shaft center boss that includes an outer side face and a hole into which a rotating shaft is inserted so as to transmit a driving force to, and rotate, the disk storage medium; and
   a plurality of ribs for joining the outer side face of the shaft center boss and the inner side face of the disk mounting section together so that multiple through holes are formed between the outer side face of the shaft center boss and the inner side face of the disk mounting section, a portion of each said rib being connected to associated one of the rib supporting bosses.

9. The turntable of claim 8, wherein each said rib supporting boss is in the shape of a cylinder.

10. The turntable of claim 9, wherein the number of the ribs is three or more.

11. The turntable of claim 9, wherein the number of the ribs is six.

12. The turntable of claim 11, wherein the disk mounting section, the shaft center boss and the ribs have been formed together out of a resin or a metal.

13. The turntable of claim 12, wherein each said rib supporting boss comprises a protrusion at the bottom of its cylinder, the protrusion having been formed by a gate, through which the resin or metal is injected, while the turntable is formed out of the resin or metal.

14. The turntable of claim 11, wherein the disk mounting section comprises: a disk mounting base that includes the disk mount surface and the inner side face; and the center boss.

15. The turntable of claim 14, wherein the disk mounting base, the shaft center boss and the ribs have been formed together out of a resin or a metal.

16. The turntable of claim 15, wherein each said rib supporting boss comprises a protrusion at the bottom of its cylinder, the protrusion having been formed by a gate, through which the resin or metal is injected, while the turntable is formed out of the resin or metal.

17. The turntable of claim 16, wherein the disk mounting section comprises a force-applying mechanism for applying a force on the disk storage medium so that the disk storage medium is pressed toward the mount surface.

18. The turntable of claim 17, wherein the force-applying mechanism comprises: a plurality of spherical bodies; a plurality of openings provided along the outer side face of the center boss; and an elastic body for applying a force on the spherical bodies so that the spherical bodies are pressed toward, and partially exposed through, the openings.

19. The turntable of claim 18, wherein the disk mounting section further comprises: a force-removing mechanism for removing the force that has been applied by the elastic body on the spherical bodies toward the openings; and a plurality of disk uplifting levers for lifting the disk storage medium up from the disk mount surface in conjunction with the force-removing mechanism.

20. The turntable of claim 19, wherein the number of the spherical bodies and the number of the disk uplifting levers are each three or more.

21. A turntable for a disk storage medium, the turntable comprising:

a disk mounting section that includes a disk mount surface, a center boss and an inner side surface, the disk mount surface being used to mount the disk storage medium thereon, the center boss having an outer side face that engages with a center hole of the disk storage medium, the inner side face defining a space that has a center axis aligned with that of the center boss;

a shaft center boss that includes an outer side face and a hole into which a rotating shaft is inserted so as to transmit a driving force to, and rotate, the disk storage medium, the hole of the shaft center boss, into which the rotating shaft is inserted, has multiple concave portions on the inner side face thereof; and a plurality of ribs for joining the outer side face of the shaft center boss and the inner side face of the disk mounting section together so that multiple through holes are formed between the outer side face of the shaft center boss and the inner side face of the disk mounting section, the concave portions of the holes are arranged along the ribs.

* * * * *

UNITED STATES PATENT AND TRADEMARK OFFICE
CERTIFICATE OF CORRECTION

PATENT NO.   : 6,938,265 B2
DATED        : August 30, 2005
INVENTOR(S)  : Kozo Ezawa et al.

It is certified that error appears in the above-identified patent and that said Letters Patent is hereby corrected as shown below:

<u>Title page,</u>
Item [75], Inventors, the first and third inventor's address should read
-- Hirakata-shi (JP) --; the second inventor's address should read -- Sakai-shi (JP) --;
the fourth inventor's address should read -- Sendai-shi (JP) --.

<u>Column 13,</u>
Line 46, after "boss", insert -- That --.

<u>Column 15,</u>
Line 4, after "pressed toward the", insert -- disk --.

Signed and Sealed this

Twenty-first Day of March, 2006

JON W. DUDAS
*Director of the United States Patent and Trademark Office*